US012715217B2

(12) United States Patent
Inamoto et al.

(10) Patent No.: US 12,715,217 B2
(45) Date of Patent: Aug. 25, 2026

(54) LIQUID DISCHARGE APPARATUS

(71) Applicant: CANON KABUSHIKI KAISHA, Tokyo (JP)

(72) Inventors: Yoshiyuki Inamoto, Kanagawa (JP); Ryosuke Araki, Kanagawa (JP); Tetsuji Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 18/752,607

(22) Filed: Jun. 24, 2024

(65) Prior Publication Data

US 2025/0018715 A1 Jan. 16, 2025

(30) Foreign Application Priority Data

Jul. 11, 2023 (JP) ................................ 2023-114019

(51) Int. Cl.
*B41J 2/165* (2006.01)
*B41J 25/304* (2006.01)

(52) U.S. Cl.
CPC ....... *B41J 2/16505* (2013.01); *B41J 2/16508* (2013.01); *B41J 2/16511* (2013.01); *B41J 25/304* (2013.01)

(58) Field of Classification Search
CPC ......................... B41J 2/16505; B41J 2/16508; B41J 2/16511; B41J 25/304
See application file for complete search history.

(56) References Cited

U.S. PATENT DOCUMENTS

2007/0263027 A1 11/2007 Suzuki et al. ........... B41J 2/165
2010/0033531 A1 2/2010 Suzuki et al. ........... B41J 2/165
2013/0100199 A1 4/2013 Suzuki et al. ........... B41J 2/165
2015/0266306 A1 9/2015 Sunouchi et al. ....... B41J 2/175
2019/0070855 A1 3/2019 Yamaguchi et al.
2024/0308223 A1 9/2024 Araki et al. ............. B41J 2/165

FOREIGN PATENT DOCUMENTS

JP 2003200581 A * 7/2003 .............. B41J 2/165
JP 2009078512 A * 4/2009 .......... B41J 2/16511
JP 2019-043116 3/2019

OTHER PUBLICATIONS

U.S. Appl. No. 18/744,470, filed Jun. 14, 2024.
U.S. Appl. No. 18/763,293, filed Jul. 3, 2024.
U.S. Appl. No. 18/778,957, filed Jul. 20, 2024.
U.S. Appl. No. 18/913,794, filed Oct. 11, 2024.

* cited by examiner

*Primary Examiner* — Yaovi M Ameh
(74) *Attorney, Agent, or Firm* — Venable LLP

(57) ABSTRACT

A liquid discharge apparatus includes a holding unit to hold a discharge head, a cap to cap a discharge surface of the discharge head, a positioning unit to position the discharge head at a cap position, and a separation member to separate the cap from the discharge surface positioned at the cap position when the separation member is in a first posture and to bring the cap into contact with the discharge surface positioned at the cap position when the separation member is in a second posture. The separation member changes posture between the first and second postures as the holding unit is displaced relative to the discharge head when the discharge head is positioned at the cap position by the positioning unit. The discharge head is held by the holding unit such that the holding unit relatively displaces with respect to the discharge head.

8 Claims, 27 Drawing Sheets

LIQUID DISCHARGE APPARATUS

CLAIM TO PRIORITY

This application claims the benefit of Japanese Patent Application No. 2023-114019, filed on Jul. 11, 2023, which is hereby incorporated by reference herein in its entirety.

BACKGROUND OF THE DISCLOSURE

Field of the Disclosure

The present disclosure relates to a liquid discharge apparatus.

Description of the Related Art

Conventionally, a liquid discharge apparatus configured to print characters, images, and the like, by discharging ink droplets onto a printing media, such as print paper or a resin sheet, has been known. The liquid discharge apparatus has types as follows. The liquid discharge apparatus of the first type is a serial-type liquid discharge apparatus in which a liquid discharge head performs printing by discharging ink droplets while reciprocating in a direction intersecting the conveyance direction of a printing media. The liquid discharge apparatus of the second type is a line-head-type liquid discharge apparatus in which a liquid discharge head does not move relative to the body of the apparatus and performs printing by discharging ink droplets in a fixed posture in accordance with conveyance of a printing media. In such a liquid discharge apparatus, when nozzles of the liquid discharge head are continuously in contact with air, ink in the nozzles dries and potentially becomes thickened and firmly fixed. Furthermore, when ink in the nozzles is mixed with paper powder and dust, the nozzles are clogged, and print quality degradation due to ink discharge defect and failure of the liquid discharge head potentially occur. A liquid discharge apparatus that solves this problem is disclosed in Japanese Patent Laid-Open No. 2019-43116 (hereafter referred to as the '116 document). This liquid discharge apparatus includes a liquid discharge head that can be raised and lowered, a cap unit that can cap a discharge port surface of the liquid discharge head, and a support unit that can support the cap unit. When the liquid discharge head is lowered and the discharge port surface is capped by a first surface of the cap unit, the support unit supports a second surface of the cap unit, which faces the first surface.

However, in the liquid discharge apparatus disclosed in the literature, a liquid discharge surface of the liquid discharge head is brought into contact with the cap unit while the liquid discharge head is moved by a cap positioning member. Thus, positioning is performed in a state in which the liquid discharge surface of the liquid discharge head is in contact with the cap unit. Accordingly, since the liquid discharge head is moved after the liquid discharge surface of the liquid discharge head contacts the cap unit, the position of the liquid discharge surface of the liquid discharge head is shifted relative to the cap unit, which potentially spoils a sealing property.

SUMMARY OF THE DISCLOSURE

An embodiment of the present disclosure is a liquid discharge apparatus including a holding unit configured to hold a discharge head configured to discharge liquid, a cap configured to cap a discharge surface of the discharge head, a positioning unit configured to position the discharge head at a cap position where the discharge surface is capped by the cap, and a separation member configured to separate the cap from the discharge surface positioned at the cap position in a case when the separation member is in a first posture and bring the cap into contact with the discharge surface positioned at the cap position in a case when the separation member is in a second posture. The separation member changes posture between the first posture and the second posture as the holding unit is displaced relative to the discharge head in a state in which the discharge head is positioned at the cap position by the positioning unit.

Further features of the present disclosure will become apparent from the following description of exemplary embodiments with reference to the attached drawings.

DESCRIPTION OF THE EMBODIMENTS

First Embodiment

Figure 1:
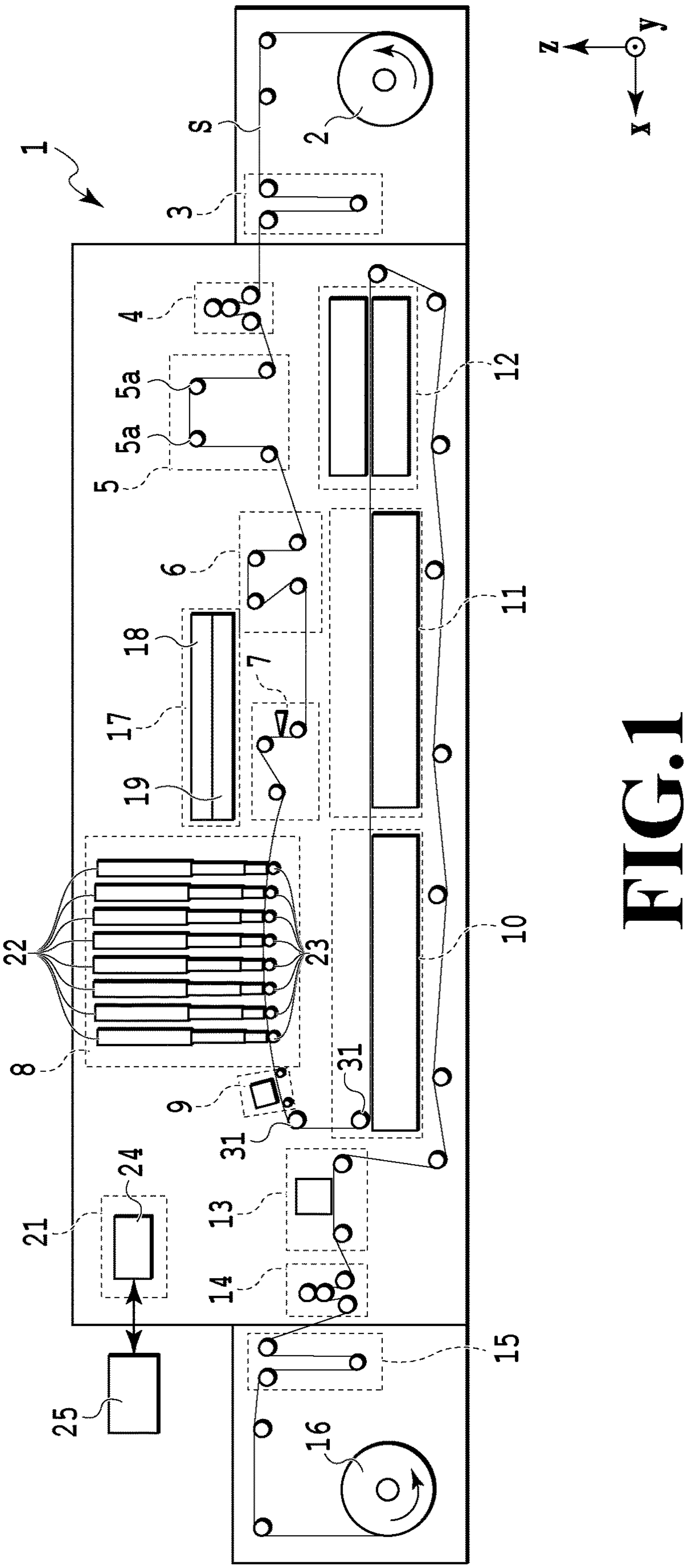
FIG. 1 is a schematic front view illustrating an internal configuration of a liquid discharge apparatus.

Embodiments of the present disclosure will be described below with reference to the accompanying drawings. The up-down direction (Z direction) on the sheet of FIG. 1 is referred to as an apparatus up-down direction, the right-left direction (X direction) on the sheet is referred to as an apparatus width direction, and a direction (Y direction) perpendicularly penetrating through the sheet is referred to as an apparatus depth direction. In addition, the near side (+Y side) of the sheet is referred to as an apparatus front side, and the far side (−Y side) of the sheet is referred to as an apparatus back side.

(Liquid Discharge Apparatus)

A liquid discharge apparatus 1 of the present embodiment illustrated in FIG. 1 is a high-speed line printer using a continuous sheet wound in a roll shape. The liquid discharge apparatus 1 includes an unwinding roll unit 2, a first dancer unit 3, a first main conveyance unit 4, a meandering correction unit 5, a conveyance detection unit 6, a mark sensor unit 7, a print unit 8, and a first scanner unit 9 inside. The liquid discharge apparatus of the present embodiment further includes a first drying unit 10, a second drying unit 11, a cooling unit 12, a second scanner unit 13, a second main conveyance unit 14, a second dancer unit 15, a winding roll unit 16, and a maintenance unit 17 inside. A sheet S is conveyed along a sheet conveyance path illustrated with solid lines in the drawing and is subjected to processing at each unit. As illustrated in FIG. 1, a conveyance direction of the sheet S (hereafter simply referred to as "conveyance direction") changes inside the liquid discharge apparatus 1, but a width direction of the sheet S (hereafter referred to as "sheet width direction") is basically constant and aligned with the apparatus depth direction. One side (+Y side) in the sheet width direction is the apparatus front side, and the other side (−Y side) is the apparatus back side.

The unwinding roll unit 2 is a unit for holding and supplying a continuous sheet wound in a roll shape. The unwinding roll unit 2 houses an unwinding roll from which the sheet S is pulled out and supplied. Note that the number of rolls that can be housed is not limited to one, but two or three or more rolls may be housed and the sheet S may be pulled out and supplied from any one of them.

The first dancer unit 3 is a unit for applying constant sheet tension between the unwinding roll unit 2 and the first main conveyance unit 4. At the first dancer unit 3, tension is applied to the sheet by using a non-illustrated tension application unit.

The first main conveyance unit 4 is a unit for feeding the sheet S to units between the meandering correction unit 5 and the second scanner unit 13 along the sheet conveyance path and applying sheet tension between the first main conveyance unit 4 and the second main conveyance unit 14. The units between the meandering correction unit 5 and the second scanner unit 13 include the meandering correction unit 5, the conveyance detection unit 6, the mark sensor unit 7, the print unit 8, the first scanner unit 9, the first drying unit 10, the second drying unit 11, the cooling unit 12, and the second scanner unit 13. The first main conveyance unit 4 rotates by driving a non-illustrated motor and conveys the sheet S with tension.

The meandering correction unit 5 is a unit for correcting meandering in the sheet width direction during tension conveyance of the sheet S. The meandering correction unit 5 includes a meandering correction roller **5*a* and a non-illustrated meandering sensing sensor configured to sense meandering of the sheet S. Tilt of the meandering correction roller 5*a* relative to the sheet S can be changed by a non-illustrated motor to correct meandering of the sheet S based on measurement by the meandering sensing sensor. In this case, the sheet S is wound around the meandering correction roller 5*a***, and accordingly, a meandering correction function can be enhanced.

The conveyance detection unit 6 is a unit for detecting the tension of the sheet S when the sheet S is conveyed with tension between the first main conveyance unit 4 and the second main conveyance unit 14. The conveyance detection unit 6 is also a unit for detecting the conveyance speed of the sheet S to control an image formation timing of the print unit 8.

The mark sensor unit 7 is a unit for detecting a mark printed on the sheet S in advance to control the image formation timing of the print unit 8.

The print unit 8 is a sheet processing unit configured to form an image on the sheet S being conveyed by performing print processing on the sheet S from above with liquid discharge heads 22. A conveyance path in the print unit 8 is formed by guide rollers 23 disposed in an arc shape that is convex upward so that constant tension is applied on the sheet S to ensure clearance between the sheet S and the liquid discharge heads 22. In the print unit 8, the plurality of liquid discharge heads 22 are arranged in the conveyance direction. In the present example, a total of eight line-type liquid discharge heads 22 corresponding to four colors of Bk (black), Y (yellow), M (magenta), and C (cyan) as well as reaction liquid and three special colors are arranged. Note that the number of colors and the number of liquid discharge heads 22 are not limited to eight. For example, a scheme using a heat generation element, a scheme using a piezo element, a scheme using an electrostatic element, or a scheme using an MEMS element may be employed as an ink jet scheme (liquid discharge scheme). Ink of each color is supplied from an ink tank (not illustrated) to the liquid discharge heads 22 through an ink tube (not illustrated).

Figure 2:
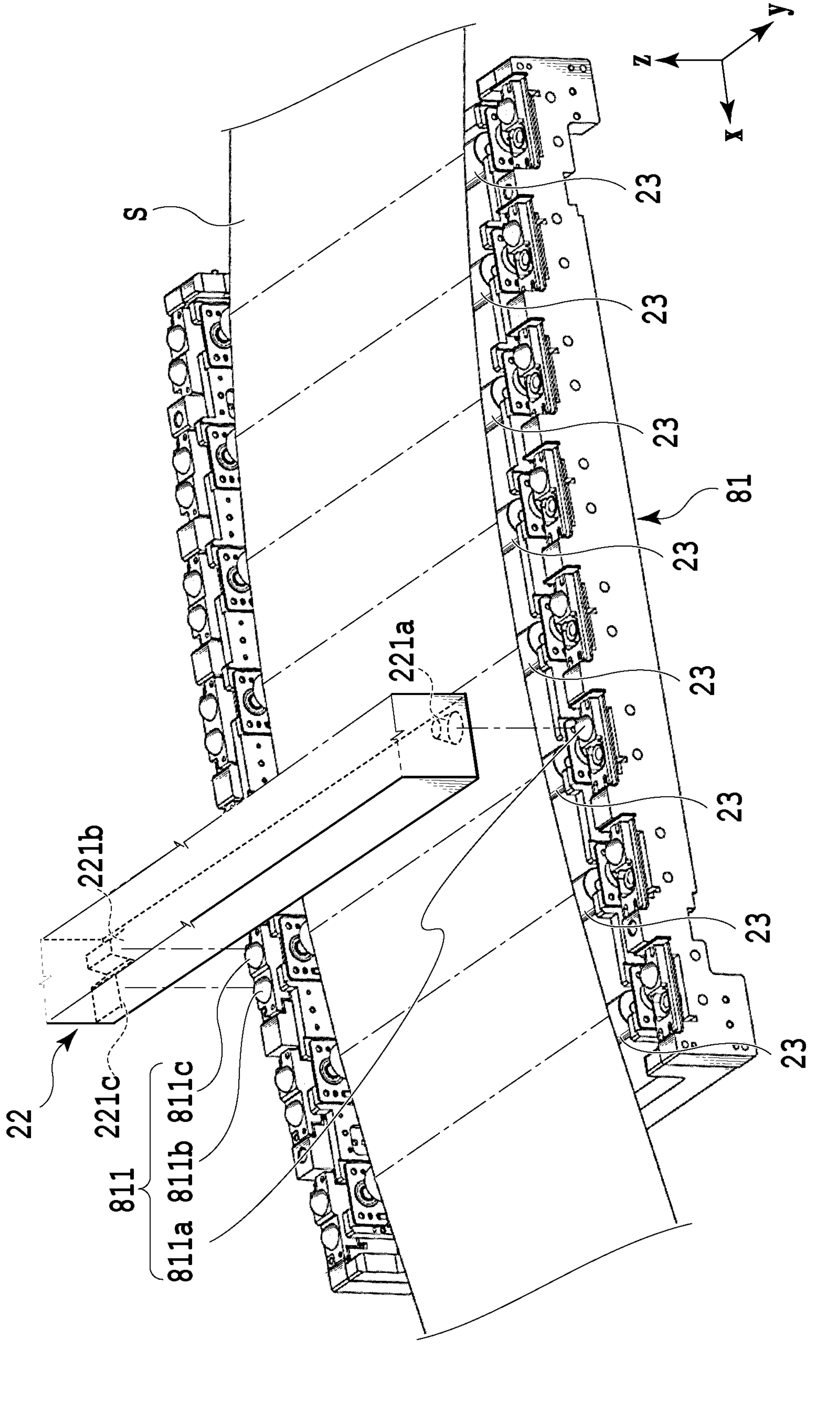
FIG. 2 is a perspective view of a sheet conveyance unit housing of a print unit.

FIG. 2 is a perspective view of a sheet conveyance unit housing 81. As illustrated in FIG. 2, the sheet conveyance unit housing 81 of the print unit 8 includes a plurality of liquid discharge head positioning members 811 (**811*a*, 811*b*, and 811***c*) for positioning the liquid discharge heads 22. In order to position the liquid discharge heads 22 relative to the sheet conveyance unit housing 81, it is needed to dispose the liquid discharge head positioning members 811 on the sheet conveyance unit housing 81 such that each three liquid discharge head positioning members 811 are not arranged at least in a line. Thus, a first liquid discharge head positioning member 811*a*, a second liquid discharge head positioning member 811*b*, and a third liquid discharge head positioning member 811*c* are disposed for each liquid discharge head 22. The first liquid discharge head positioning member 811*a* is disposed on the near side (+Y side) of the sheet S, and the second liquid discharge head positioning member 811*b* and the third liquid discharge head positioning member 811*c* are disposed on the far side (−Y side) of the sheet S. With this disposition, the sheet S is sandwiched between the first liquid discharge head positioning member 811 on one side, and the second and third liquid discharge head positioning members 811*b* and 811*c* on the opposite side in the sheet width direction (Y direction). As described later, the positions of the liquid discharge heads 22 change inside the liquid discharge apparatus 1, but a longitudinal direction of each liquid discharge head 22 (hereafter referred to as "head longitudinal direction") matches with the apparatus depth direction as illustrated in FIG. 2. One side (+Y side) in the head longitudinal direction is the apparatus front side, and the other side (−Y side) is the apparatus back side.

Figure 3:
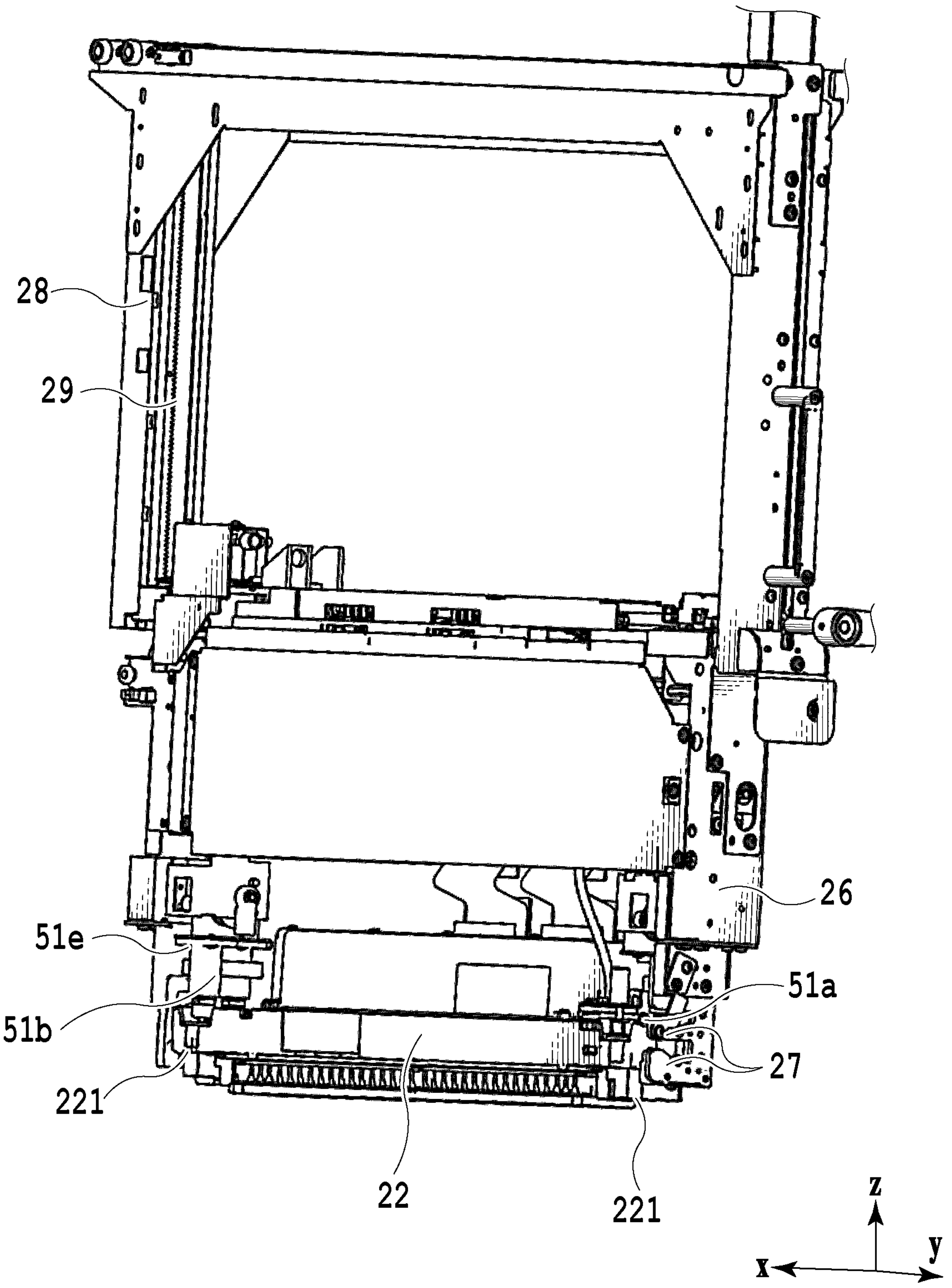
FIG. 3 is a perspective view illustrating the front surface and the left side surface of a liquid discharge head raising-lowering mechanism.
Figure 5:
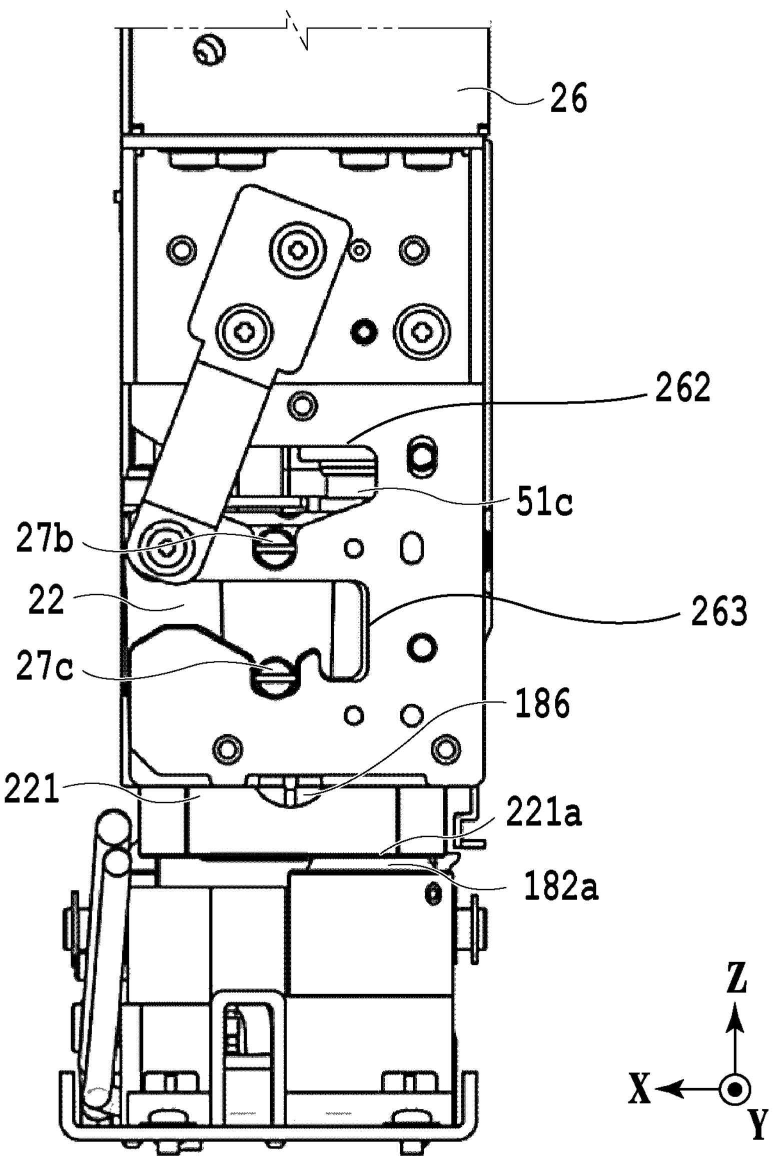
FIG. 5 is a diagram illustrating the left side surface of the liquid discharge head at the maintenance position.
Figure 6:
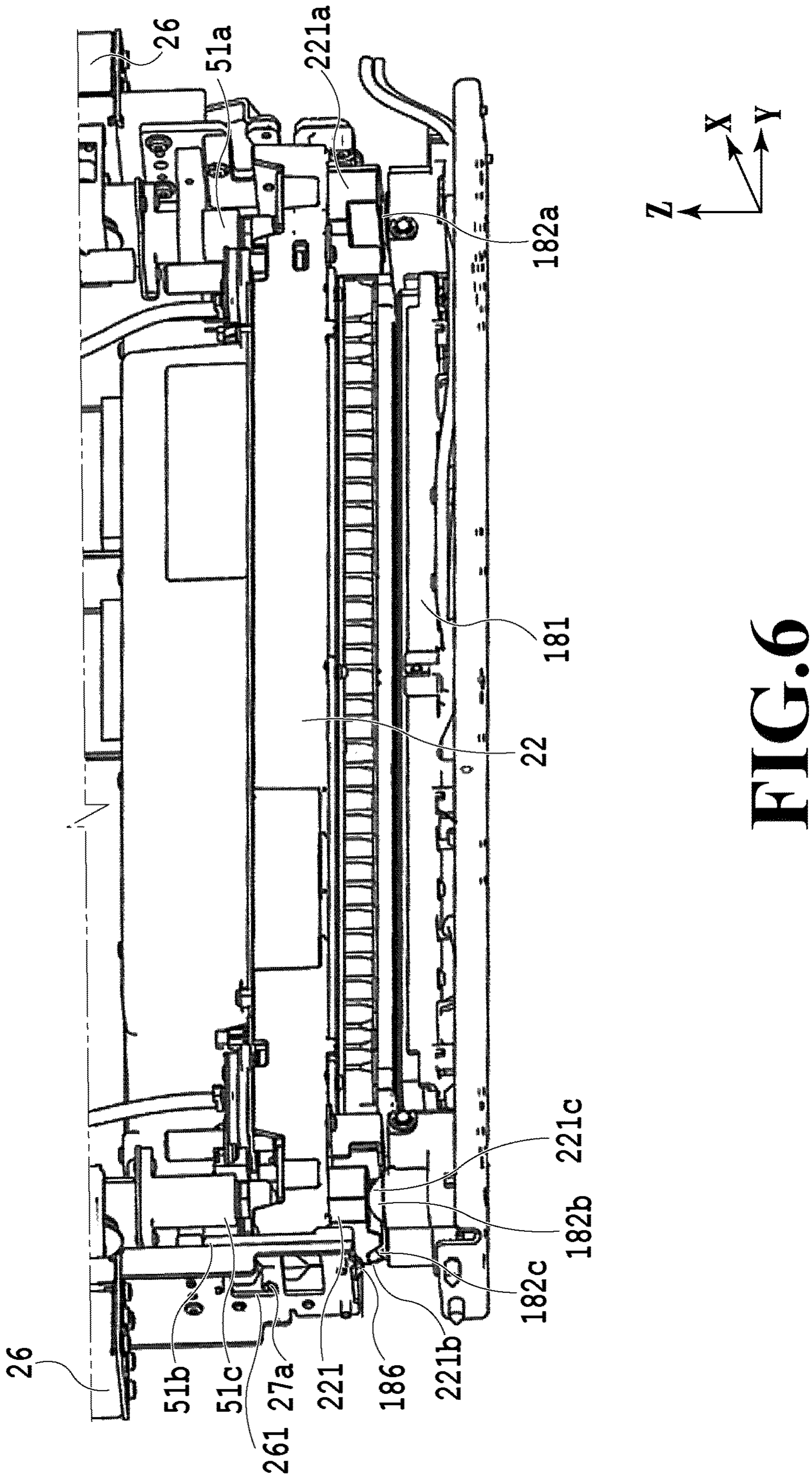
FIG. 6 is a partially perspective view illustrating the front surface and the left side surface of the liquid discharge head at the maintenance position.
Figure 7B:
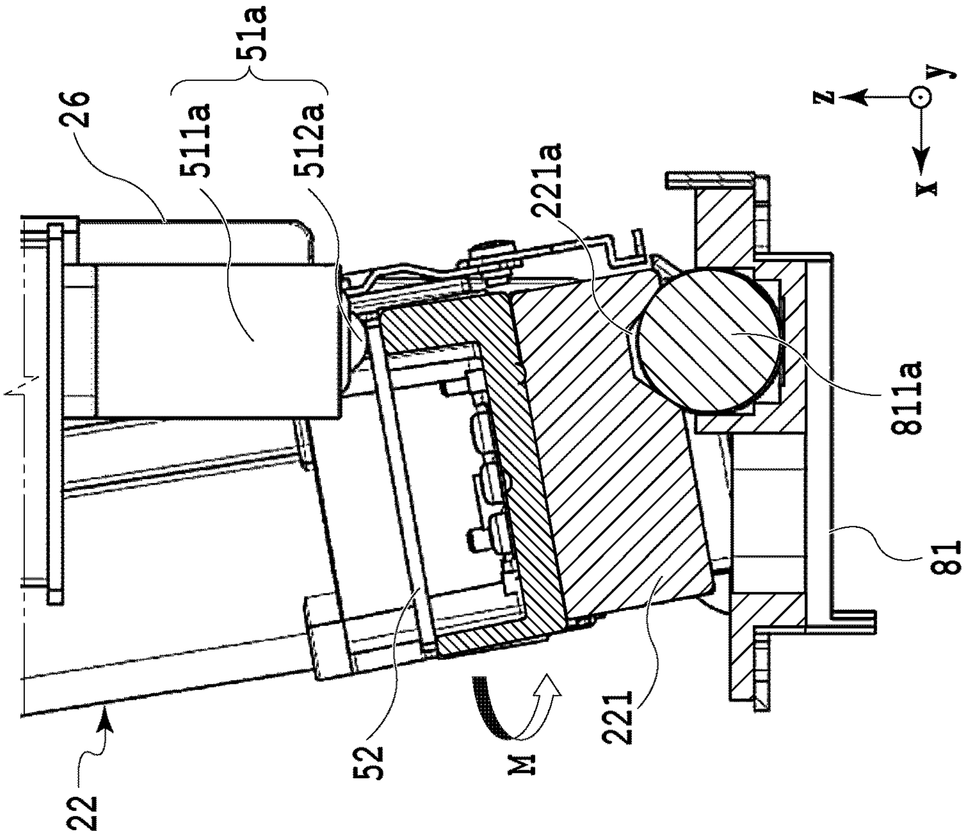
FIGS. 7A and 7B are diagrams illustrating the liquid discharge head positioned at the print unit and pressing members.
Figure 7A:
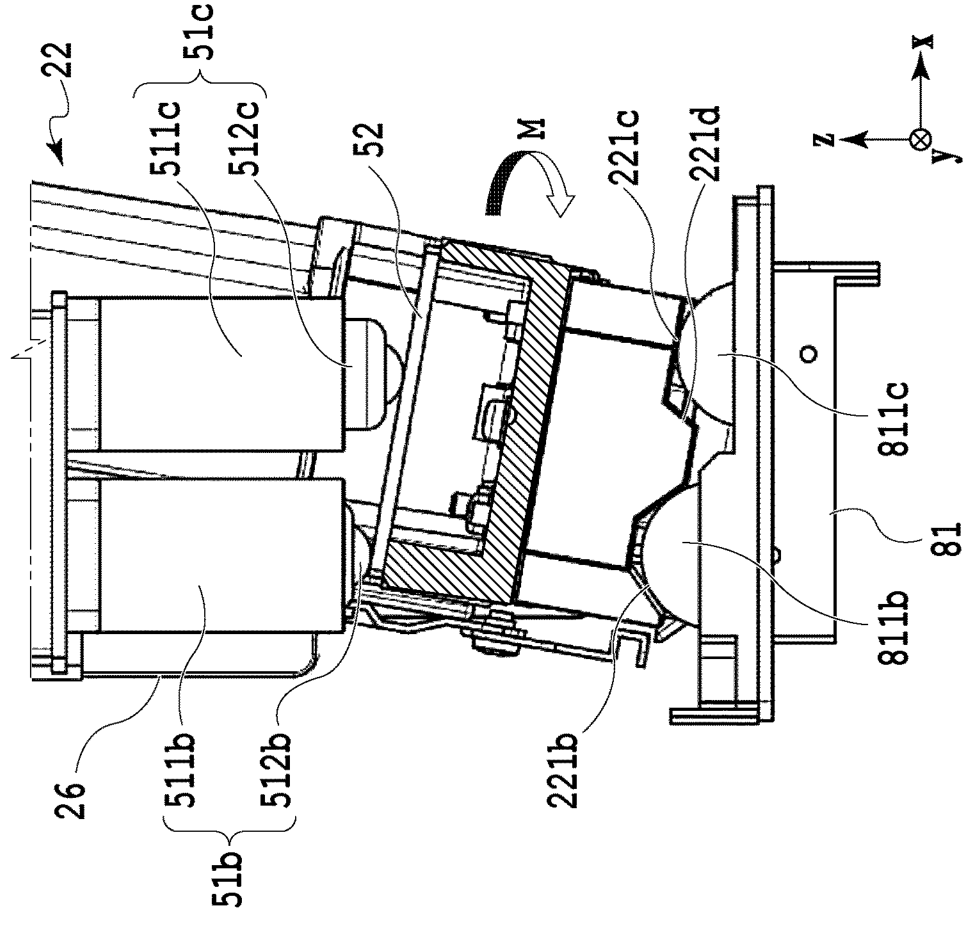

As illustrated in FIGS. 3 to 6, a liquid discharge head support shaft 27 (including a first pin 27*a*, a second pin 27*b*, and a third pin 27*c*) provided at both end parts of each liquid discharge head 22 in the longitudinal direction is inserted into holes (including a first hole 261, a second hole 262, and a third hole 263) provided at a head holding unit 26. The liquid discharge head support shaft 27 (including the first pin 27*a*, the second pin 27*b*, and the third pin 27*c*) is supported from below lower edge parts of the holes (including the first hole 261, the second hole 262, and the third hole 263). As illustrated in FIGS. 3, 7A, and 7B, each liquid discharge head 22 is pressed by a first pressing member 51*a*, a second pressing member 51*b*, and a third pressing member 51*c* provided at the head holding unit 26 and including compression springs so that the liquid discharge head 22 moves downward relative to the head holding unit 26. The first, second, and third pressing members 51*a*, 51*b*, and 51*c* are also called as the first, second, and third biasing members, respectively.

Figure 8B:
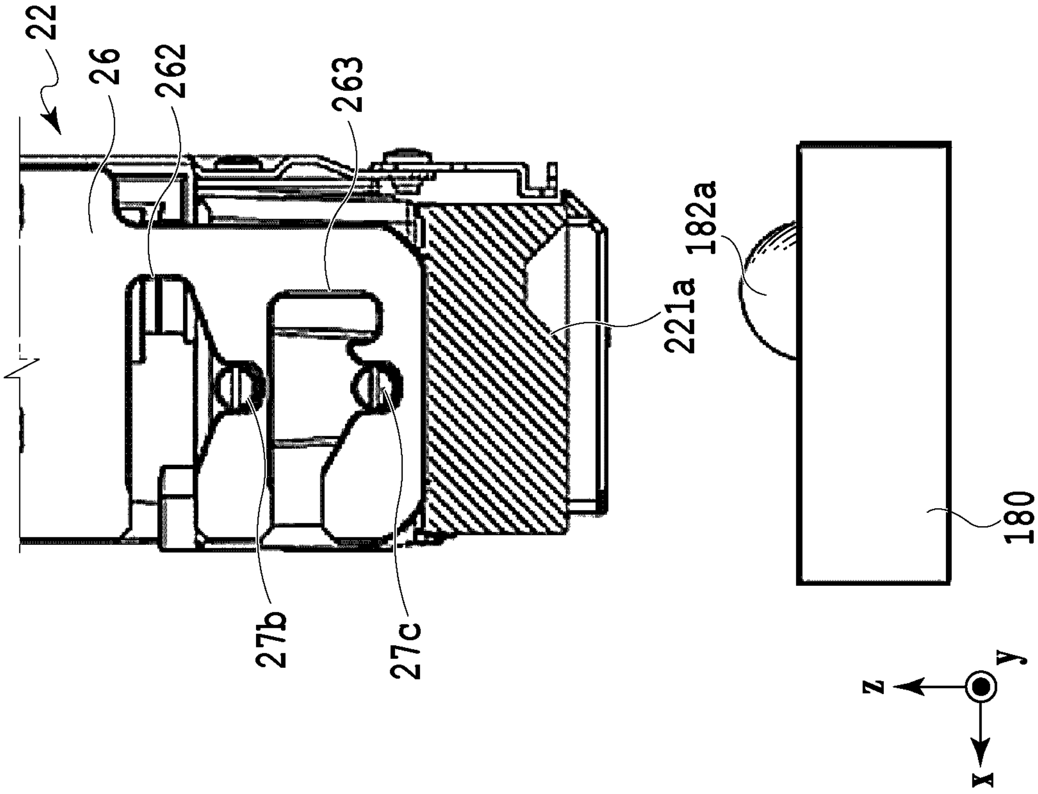
FIGS. 8A and 8B are diagrams illustrating a state in which the liquid discharge head is separated from a cap unit.
Figure 8A:
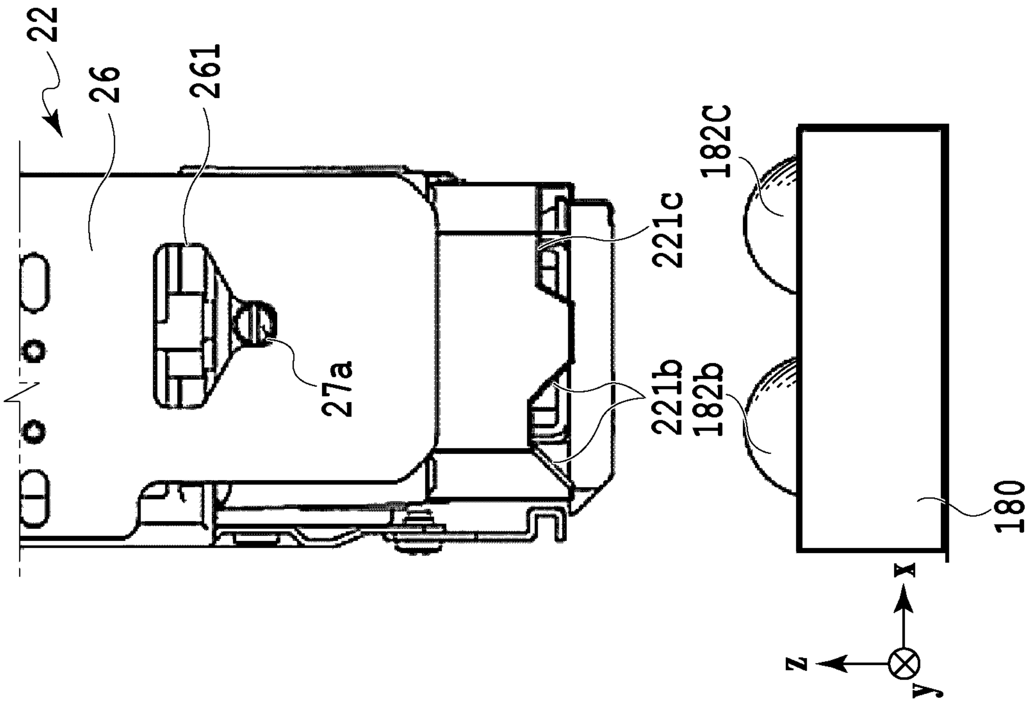

Accordingly, as illustrated in FIGS. 8A and 8B, the three pins are supported by the lower edge parts of the three holes provided at the head holding unit 26 when no external force that moves each liquid discharge head 22 upward from below relative to the head holding unit 26 is applied. Specifically, the first pin 27*a*, the second pin 27*b*, and the third pin 27*c* are supported by the lower edge parts of the first hole 261, the second hole 262, and the third hole 263, respectively. Each liquid discharge head 22 has a height relative to the head holding unit 26, which is determined by the support. Thus, the position of the liquid discharge head 22 relative to the head holding unit 26 is restricted by the relative height due to the support. The relative height of the liquid discharge head 22 with respect to the head holding unit 26, which is determined by the support, is the lowermost relative height Hmin (refer to FIG. 24) of the liquid discharge head 22 with respect to the head holding unit 26.

Figures 9A, 9B:
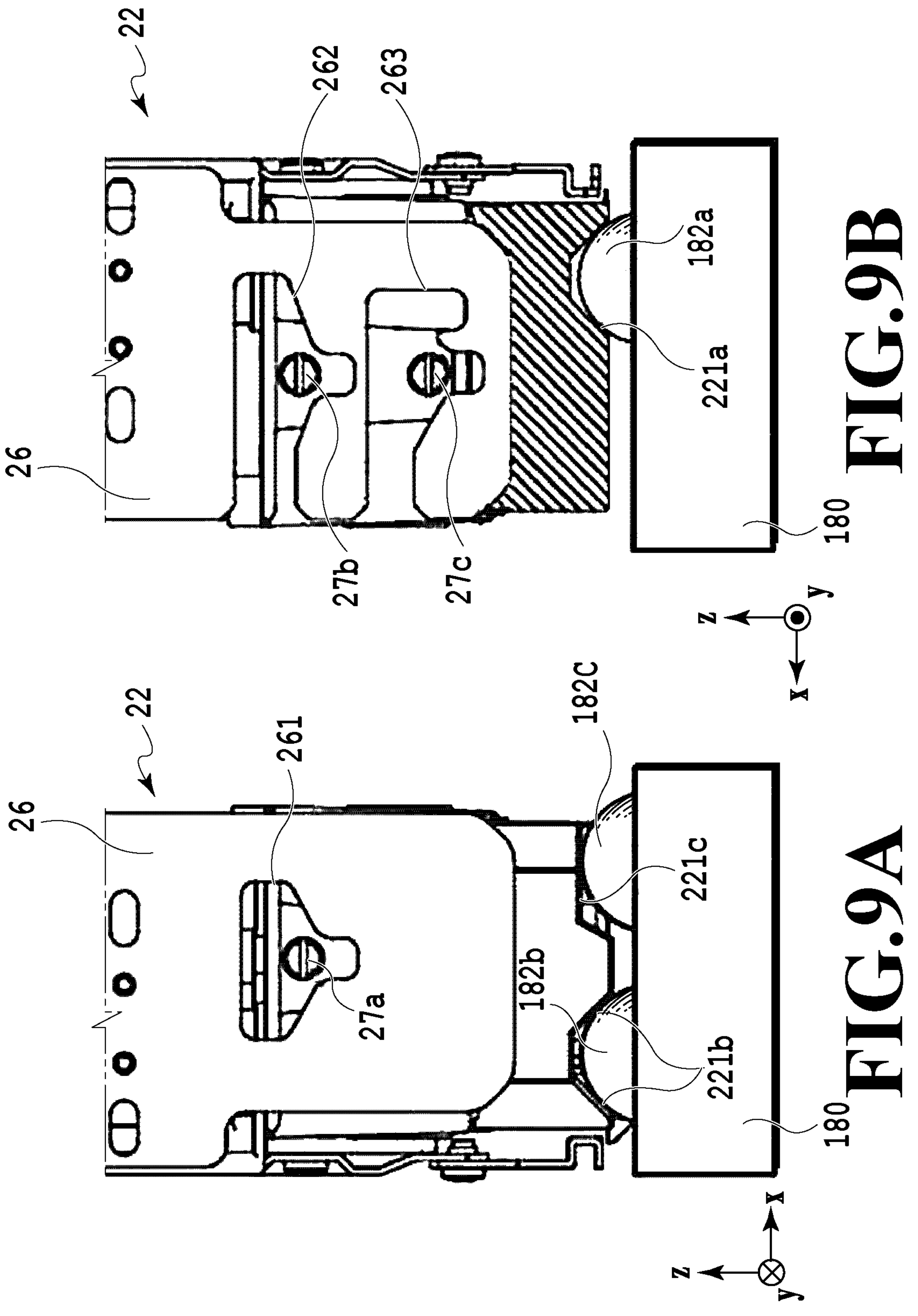
FIGS. 9A and 9B are diagrams illustrating a state in which operation of positioning the liquid discharge head relative to the cap unit is completed.

As illustrated in FIGS. 9A and 9B, each liquid discharge head 22 is displaced higher than the lowermost relative height Hmin with respect to the head holding unit 26 when external force that moves the liquid discharge head 22 from downward to upward with respect to the head holding unit 26 is applied. Note that, as illustrated in FIGS. 8A, 8B, 9A, and 9B, the moving direction of the head holding unit 26 is the apparatus up-down direction (Z direction), and the displacement directions of the first pin 27*a*, the second pin 27*b*, and the third pin 27*c* in the holes (including the first hole 261, the second hole 262, and the third hole 263) provided at the head holding unit 26 are the apparatus up-down direction (Z direction) as well. Accordingly, the moving direction of the head holding unit 26 and the displacement directions of the first pin 27*a*, the second pin 27*b*, and the third pin 27*c* in the holes (including the first hole 261, the second hole 262, and the third hole 263) provided at the head holding unit 26 are identical. Moreover, the displacement directions of the first pin 27*a*, the second pin 27*b*, and the third pin 27*c* in the holes (including the first hole 261, the second hole 262, and the third hole 263) provided at the head holding unit 26 are common, and, accordingly, the displacement direction of the liquid discharge head 22 relative to the head holding unit 26 is identical to the common displacement directions.

Note that, as illustrated in FIG. 3, the head holding unit 26 can perform vertical raising-lowering operation along a raising-lowering rail 29 provided in a liquid discharge head raising-lowering frame 28 by using a non-illustrated drive mechanism provided therein.

The first scanner unit 9 is a unit for reading an image formed on the sheet S by the print unit 8 during printing, detecting shift and concentration of the image, and correcting the printing.

The first drying unit 10 and the second drying unit 11 are units configured to reduce a liquid component contained in ink applied on the sheet S by the print unit 8, thereby enhancing fixation of the ink onto the sheet S. The second drying unit 11 is disposed downstream of the first drying unit 10 in the conveyance direction. The first drying unit 10 and the second drying unit 11 heat the sheet S, on which an image is printed, with ink and dry the ink applied on the sheet S. Inside the first drying unit 10 and the second drying unit 11, an ink application surface of the sheet S is dried by applying heated air at least from the ink application surface side to the sheet S passing therethrough. Note that the drying is not limited to a scheme of applying heated air. For example, a scheme of irradiating the surface of the sheet S with electromagnetic waves (such as ultraviolet or infrared), a conduction heat transfer scheme by contact with a heat generation body, or a scheme as combination of two or more schemes may be used.

A winding guide roller 31 is a roller that winds, at a constant winding angle, a surface of the sheet S on a side opposite the ink application surface downstream of the print unit 8 in the conveyance direction because influence of heated air from the first drying unit 10 on the print unit 8 needs to be blocked. In the present embodiment, two winding guide rollers 31 are disposed between the first scanner unit 9 and the first drying unit 10, and, accordingly, the conveyance direction is inverted by 180° approximately from the left direction to the right direction. In the liquid discharge apparatus 1, the first drying unit 10 is disposed below the print unit 8, and the second drying unit 11 is disposed below the conveyance detection unit 6 and the mark sensor unit 7 described above.

The cooling unit 12 cools the sheet S onto which ink is fixed at the first drying unit 10 and the second drying unit 11, and, accordingly, solidifies the softened ink and reduces the amount of temperature change of the sheet S in a downstream process in the liquid discharge apparatus 1. Inside the cooling unit 12, wind with temperature lower than the temperature of the sheet S is applied at least from the ink application surface side to the sheet S passing therethrough, thereby cooling the ink application surface of the sheet S. Note that the cooling is not limited to a scheme of applying wind. For example, a conduction heat transfer scheme by contact with a heat-releasing member or a scheme as combination thereof may be used.

The second scanner unit 13 is a unit for reading a test image formed on the sheet S at the print unit 8 before printing, detecting shift and concentration of the image, and correcting the printing.

The second main conveyance unit 14 is a unit configured to convey the sheet S while applying tension to the sheet S in cooperation with the first main conveyance unit 4 and adjust the tension of the sheet S. The second main conveyance unit 14 rotates by driving a non-illustrated motor. The second main conveyance unit 14 includes a clutch for drive coupling with which torque is controllable. Thus, the tension of the sheet S can be adjusted by controlling the torque with a tension control unit (not illustrated) in accordance with a tension value detected by the conveyance detection unit 6. Note that a configuration in which the speed of the second main conveyance unit 14 is controlled by the conveyance detection unit 6 may be added as an additional configuration that adjusts the tension of the sheet S. In this case, two schemes of a torque control method of controlling a torque value transferred by the clutch and a speed control method of controlling roller speed of the second main conveyance unit 14 may be prepared as a tension control method. Then, in accordance with a purpose, the torque control method and the speed control method may be switched or both simultaneously used as a tension control method.

The second dancer unit 15 is a unit for applying constant sheet tension between the second main conveyance unit 14 and the winding roll unit 16. The second dancer unit 15 applies tension to the sheet by using a non-illustrated tension application unit.

The winding roll unit 16 is a unit for winding the sheet S that is printed and processed around a winding core. The number of rolls that can be collected is not limited to one, but two or three or more winding cores may be provided and switched to collect the sheet S. Note that, depending on contents of fabrication processing after printing, a configuration of cutting a continuous sheet by using a cutter and loading the sheet S thus cut may be employed instead of a configuration of winding around a winding core.

A control unit 21 is a unit that governs control on each component included in the entire liquid discharge apparatus 1 or control at each component. The control unit 21 includes a processor, a storage apparatus, a controller including various kinds of control units, an external interface, and an operation unit 24 through which a user performs inputting and outputting. Operation of the liquid discharge apparatus 1 is controlled based on a command from the controller or a host apparatus 25 such as a host computer connected to the controller through the external interface.

Figure 10:
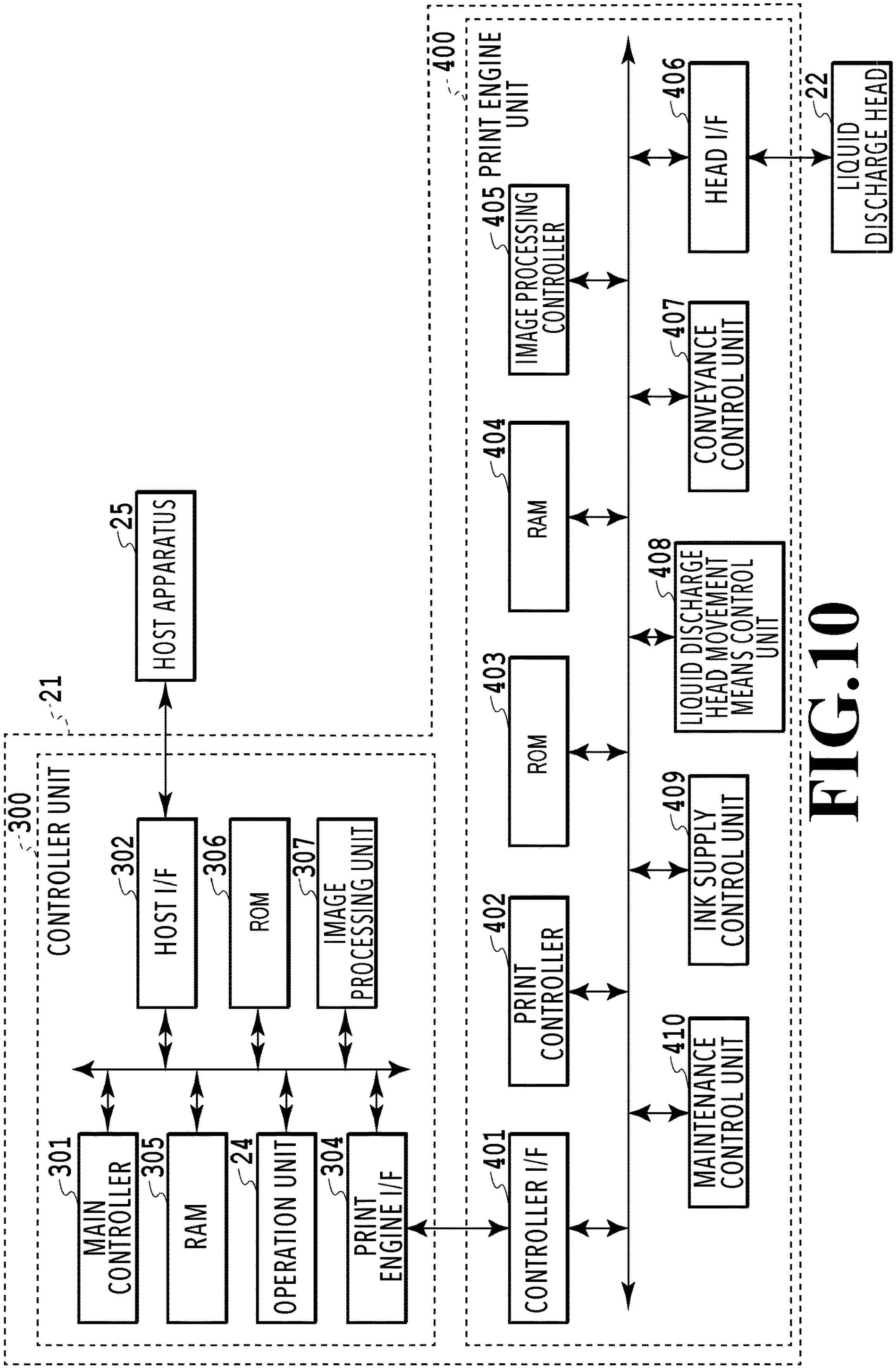
FIG. 10 is a block diagram illustrating a control configuration of the liquid discharge apparatus.

FIG. 10 is a block diagram illustrating a control configuration of the liquid discharge apparatus 1. The control configuration includes a print engine unit 400 that performs overall control of the liquid discharge apparatus 1 mainly, and a controller unit 300 that performs overall control of the entire liquid discharge apparatus 1. A print controller 402 controls various mechanisms of the print engine unit 400 in accordance with an instruction from a main controller 301 of the controller unit 300. The control configuration will be described below in detail.

In the controller unit 300, the main controller 301 constituted by a processor controls the entire liquid discharge apparatus 1 by using a RAM 305 as a work area in accordance with computer programs and various parameters stored in a ROM 306. For example, after a printing job is input from the host apparatus 25 through a host I/F 302, an image processing unit 307 provides predetermined image processing on image data included in the input printing job in accordance with an instruction from the main controller 301. Then, the main controller 301 transmits the image data provided with the image processing to the print engine unit 400 through a print engine I/F 304.

Note that the liquid discharge apparatus 1 may obtain image data from the host apparatus 25 through wireless communication or wired communication or may obtain image data from an external storage apparatus (such as a USB memory) connected to the liquid discharge apparatus 1. Communication schemes used for wireless communication and wired communication are not limited. For example, Wi-Fi (Wireless Fidelity) (registered trademark) or Bluetooth (registered trademark) is applicable as the communication scheme used for wireless communication. For example, USB (Universal Serial Bus) is applicable as the communication scheme used for wired communication.

The operation unit 24 is a mechanism for a user to perform inputting to and outputting from the liquid discharge apparatus 1. Through the operation unit 24, the user can set a printing mode to the liquid discharge apparatus 1 and recognize information related to the liquid discharge apparatus 1.

In the print engine unit 400, the print controller 402 constituted by a processor controls various mechanisms provided at the liquid discharge apparatus 1 by using a RAM 404 as a work area in accordance with computer programs and various parameters stored in a ROM 403. Once various kinds of commands and image data are received through a controller I/F 401, the print controller 402 temporarily stores them in the RAM 404. The print controller 402 causes an image processing controller 405 to convert the stored image data into print data so that the data can used for print operation by the liquid discharge heads 22. Once the print data is generated, the print controller 402 causes the liquid discharge heads 22 to execute print operation based on the print data through a head I/F 406. In this case, the print controller 402 drives components illustrated in FIG. 1 through a conveyance control unit 407 to convey the sheet S. The components include the unwinding roll unit 2, the first dancer unit 3, the first main conveyance unit 4, the meandering correction unit 5, the conveyance detection unit 6, the mark sensor unit 7, and the print unit 8. The components further include the first scanner unit 9, the first drying unit 10, the second drying unit 11, the cooling unit 12, the second scanner unit 13, the second main conveyance unit 14, the second dancer unit 15, and the winding roll unit 16. Print operation by the liquid discharge heads 22 is executed in cooperation with conveyance operation of the sheet S in accordance with an instruction from the print controller 402, and accordingly, printing processing is performed.

A liquid discharge head movement means control unit 408 changes the positions of the liquid discharge heads 22 in accordance with the operation state of the liquid discharge apparatus 1 such as a maintenance state or a print state. An ink supply control unit 409 controls an ink supply unit (not illustrated) so that ink supplied to the liquid discharge heads 22 has a pressure in an appropriate range. A maintenance control unit 410 controls operation of the maintenance unit 17 (FIG. 1) when maintenance operation is performed on the liquid discharge heads 22.

As illustrated in FIG. 1, the maintenance unit 17 is a unit including a cap tray 18, in which a cap mechanism 181 that protects a liquid discharge surface of each liquid discharge head 22, is disposed, and a cleaning tray 19, in which a cleaning mechanism that recovers discharge performance, is disposed. The maintenance unit 17 will be described later in detail.

(Configuration of Liquid Discharge Head and Positioning Thereof to Printing Position)

Figure 11:
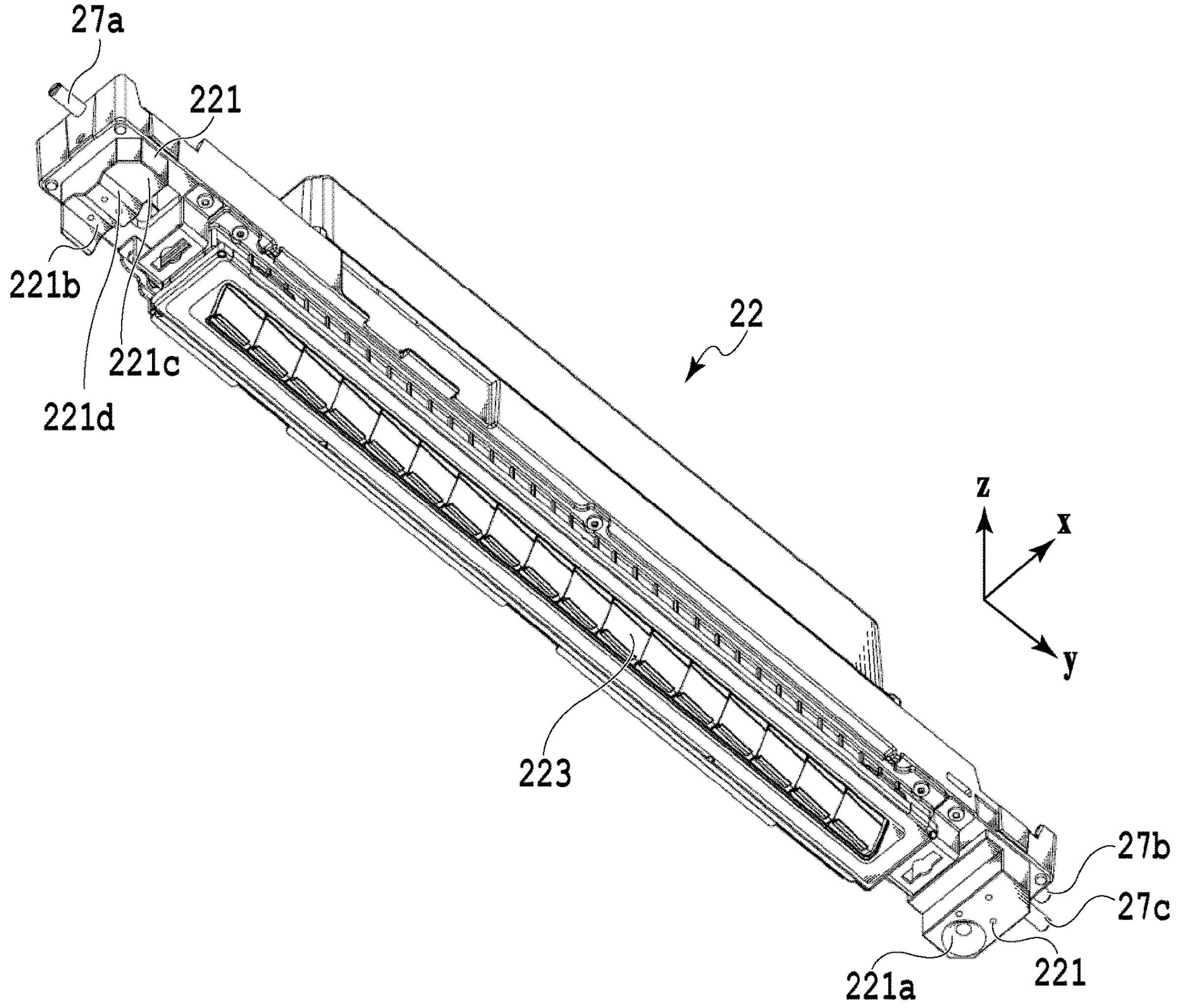
FIG. 11 is a perspective view of the liquid discharge head.

FIG. 11 is a perspective view of each liquid discharge head 22. As illustrated in FIG. 11, in the liquid discharge head 22, nozzle plates 223 provided with a plurality of nozzles that discharge ink are arrayed in the liquid discharge head longitudinal direction (that is, the Y direction), and a pair of positioning members 221 are provided at respective ends of the liquid discharge head 22. A first contact part 221*a* made of a recessed part having a slant face in a circular cone shape is formed at the positioning member 221 on the apparatus front side in the head longitudinal direction. A second contact part 221*b* including a groove part having two planes in a V shape and a third contact part 221*c* including a plane part are formed at the positioning member 221 on the apparatus back side in the head longitudinal direction. A guide shape 221*d* is provided near the third contact part 221*c*. The guide shape 221*d* functions to solve a problem that when the third contact part 221*c* and the third liquid discharge head positioning member 811*c* contact each other, the liquid discharge head 22 slips, positional shift occurs, a ball does not enter a positioning part, and positioning cannot be performed.

The first pin 27*a* extending in the liquid discharge head longitudinal direction is provided at one end of the liquid discharge head 22 in the liquid discharge head longitudinal direction, and the second pin 27*b* and the third pin 27*c* extending in the liquid discharge head longitudinal direction are provided at the other end.

The first contact part 221*a* and the second contact part 221*b* of the liquid discharge head 22 are accurately disposed such that a straight line connecting the centers of the contact parts in the longitudinal direction of the liquid discharge head 22 is parallel to the array of the plurality of nozzle plates 223 of the liquid discharge head 22. The third contact part 221*c* is disposed at a position separated from the second contact part 221*b* in a direction orthogonal to the liquid discharge head longitudinal direction.

Figure 12:
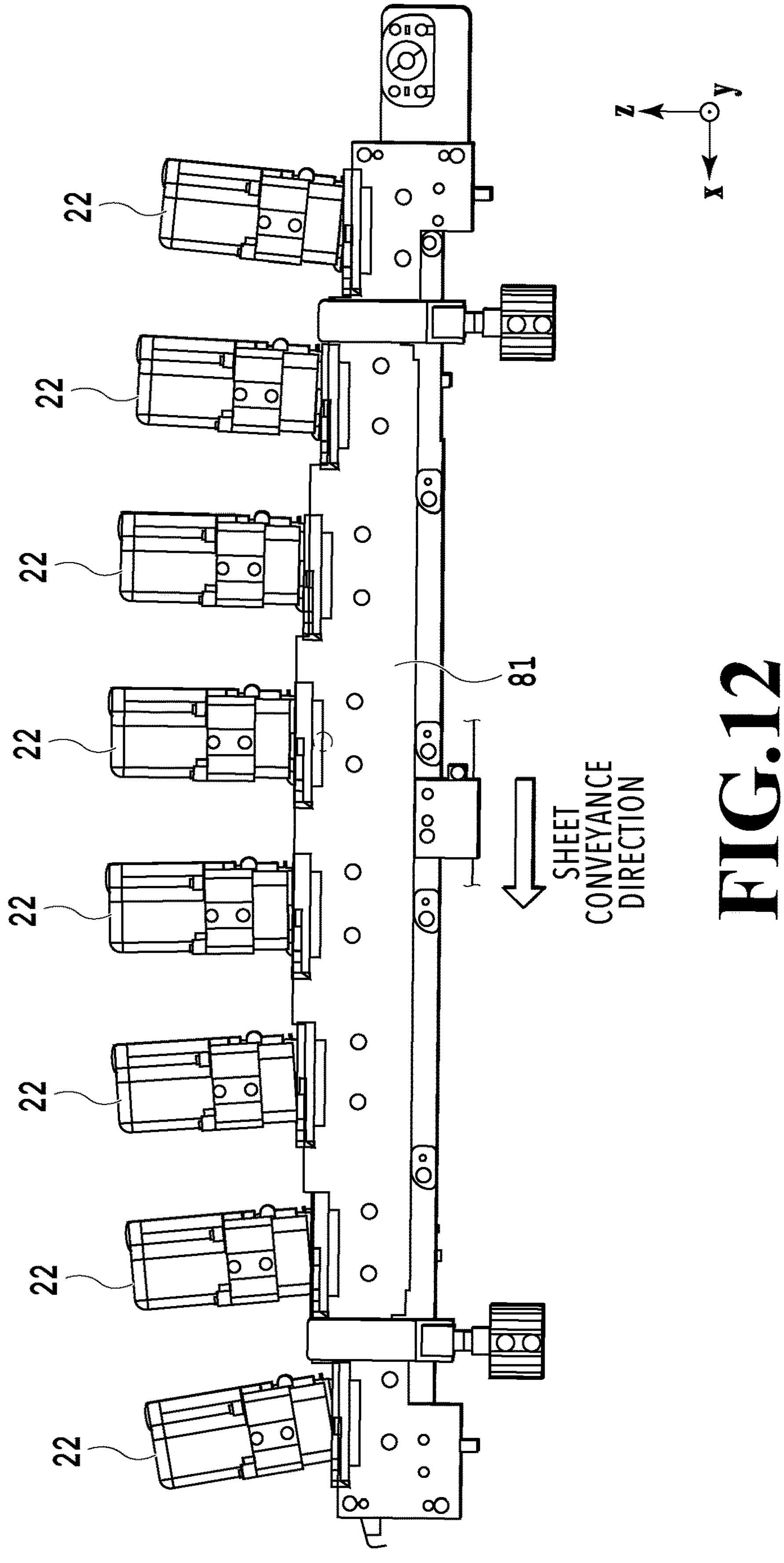
FIG. 12 is a diagram illustrating a state in which a plurality of liquid discharge heads are positioned at respective print positions.

FIG. 12 illustrates a state in which the plurality of liquid discharge heads 22 at different disposition heights are positioned in contact with the liquid discharge head positioning members 811 (811*a*, 811*b*, and 811*c*) provided at the sheet conveyance unit housing 81. As illustrated in FIG. 12, in the present embodiment, the plurality of liquid discharge heads 22 are positioned with tilts at mutually different angles in the conveyance direction in a circular arc shape. However, any liquid discharge head 22 does not necessarily need to have a tilt angle relative to the horizontal direction but may have no tilt angle relative to the horizontal direction.

FIGS. 7A and 7B illustrate the head holding unit 26 and each liquid discharge head 22 when the liquid discharge head 22 is positioned at a printing position at S2204 (refer to FIG. 22) to be described later. The head holding unit 26 supporting the liquid discharge head 22 is provided with three pressing members 51 of the first pressing member 51*a*, the second pressing member 51*b*, and the third pressing member 51*c*. The first pressing member 51*a* is disposed above the first contact part 221*a* of the liquid discharge head 22. The second pressing member 51*b* is disposed above the second contact part 221*b* of the liquid discharge head 22. The third pressing member 51*c* is disposed above the third contact part 221*c* of the liquid discharge head 22.

The first pressing member 51*a* is constituted by a first base part 511*a*, a first slide part 512*a*, and a first spring (not illustrated), and the first slide part 512*a* can slide relative to the first base part 511*a*. Similarly, the second pressing member 51*b* is constituted by a second base part 511*b*, a second slide part 512*b*, and a second spring (not illustrated), and the second slide part 512*b* can slide relative to the second base part 511*b*. In addition, the third pressing member 51*c* is constituted by a third base part 511*c*, a third slide part 512*c*, and a third spring (not illustrated), and the third slide part 512*c* can slide relative to the third base part 511*c*.

A plate 52 is provided in contact with the second slide part 512*b* and the third slide part 512*c* at one end of the liquid discharge head 22 in the longitudinal direction. Another plate 52 is provided in contact with the first slide part 512*a* at the other end of the liquid discharge head 22 in the longitudinal direction.

The slide parts 512*a*, 512*b*, and 512*c* each has a spherical part contacting the corresponding plate 52 and can slide relative to the plate 52. As illustrated in FIGS. 7A and 7B, pressing positions of the pressing members when the liquid discharge head 22 is in contact are set based on consideration of a moment M about the positioning members 811. Specifically, the pressing positions are set to hold a relation that involves load application with which the contact parts 221*a*, 221*b*, and 221*c* of the positioning members 221 definitely land on the positioning members 811*a*, 811*b*, and 811*c*.

(Configuration of Maintenance Unit)

Figure 13:
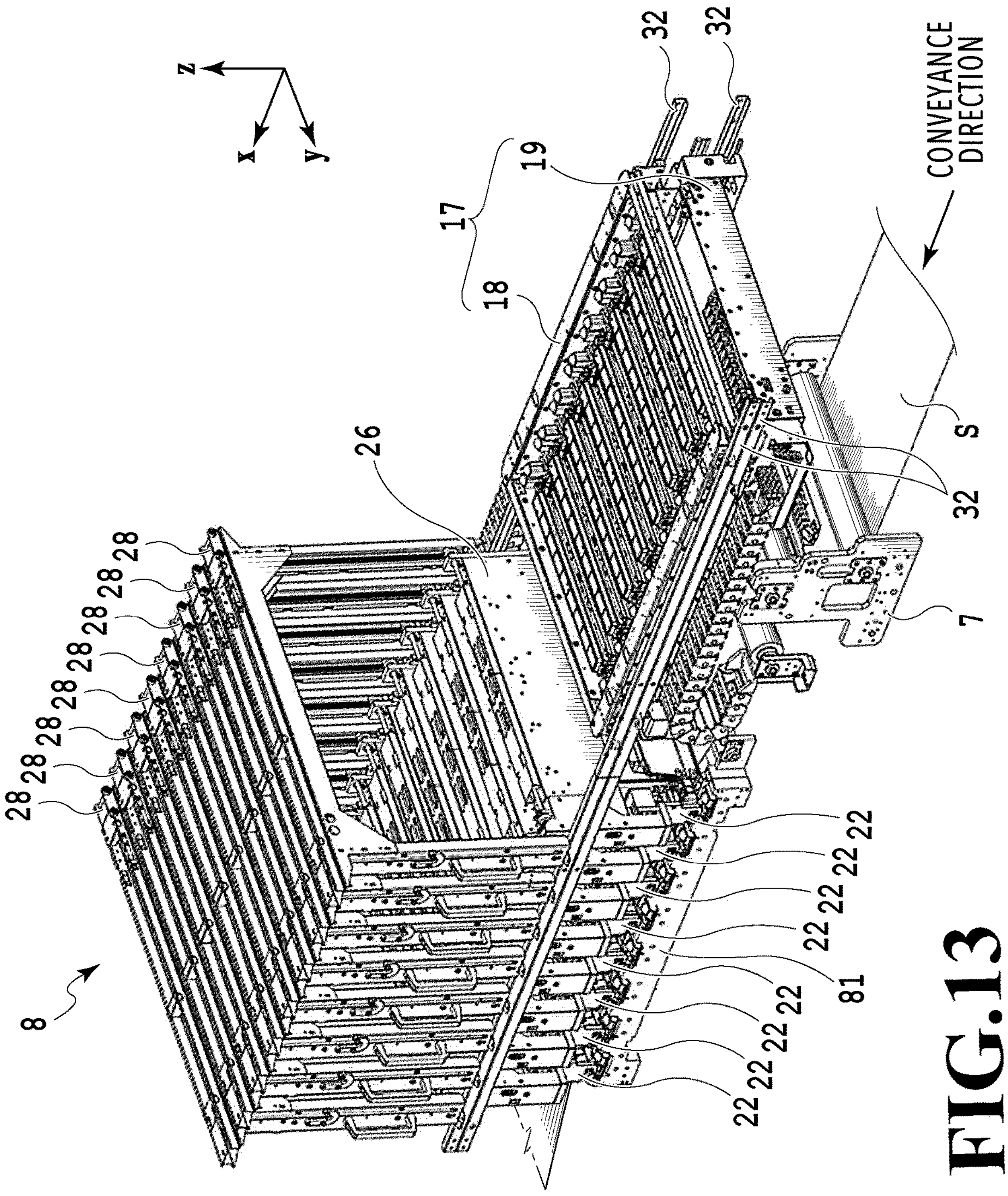
FIG. 13 is a perspective view illustrating disposition of the liquid discharge heads, a cap tray, and a cleaning tray at printing.
Figure 14:
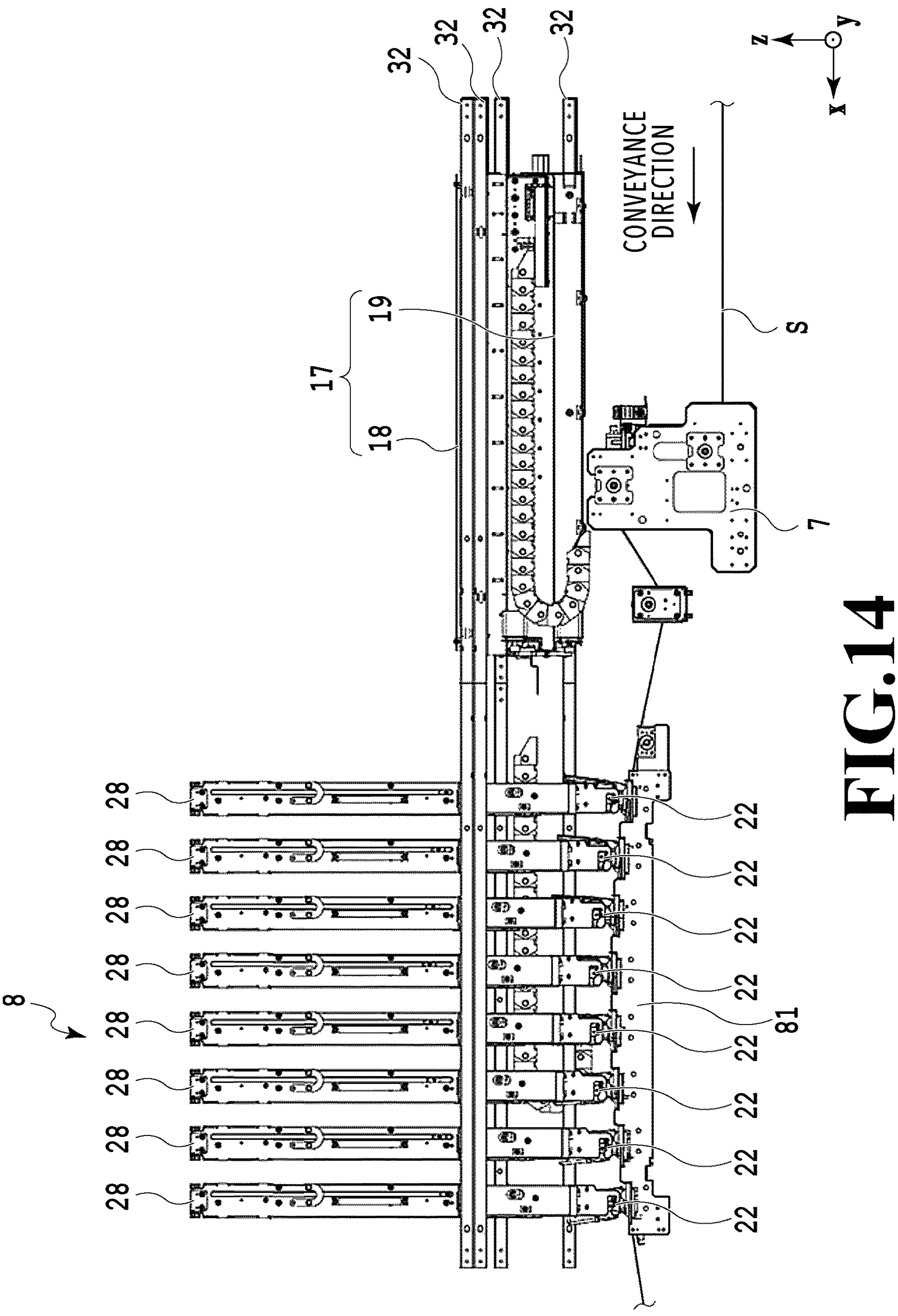
FIG. 14 is a front view illustrating disposition of the liquid discharge heads, the cap tray, and the cleaning tray at printing.
Figure 15:
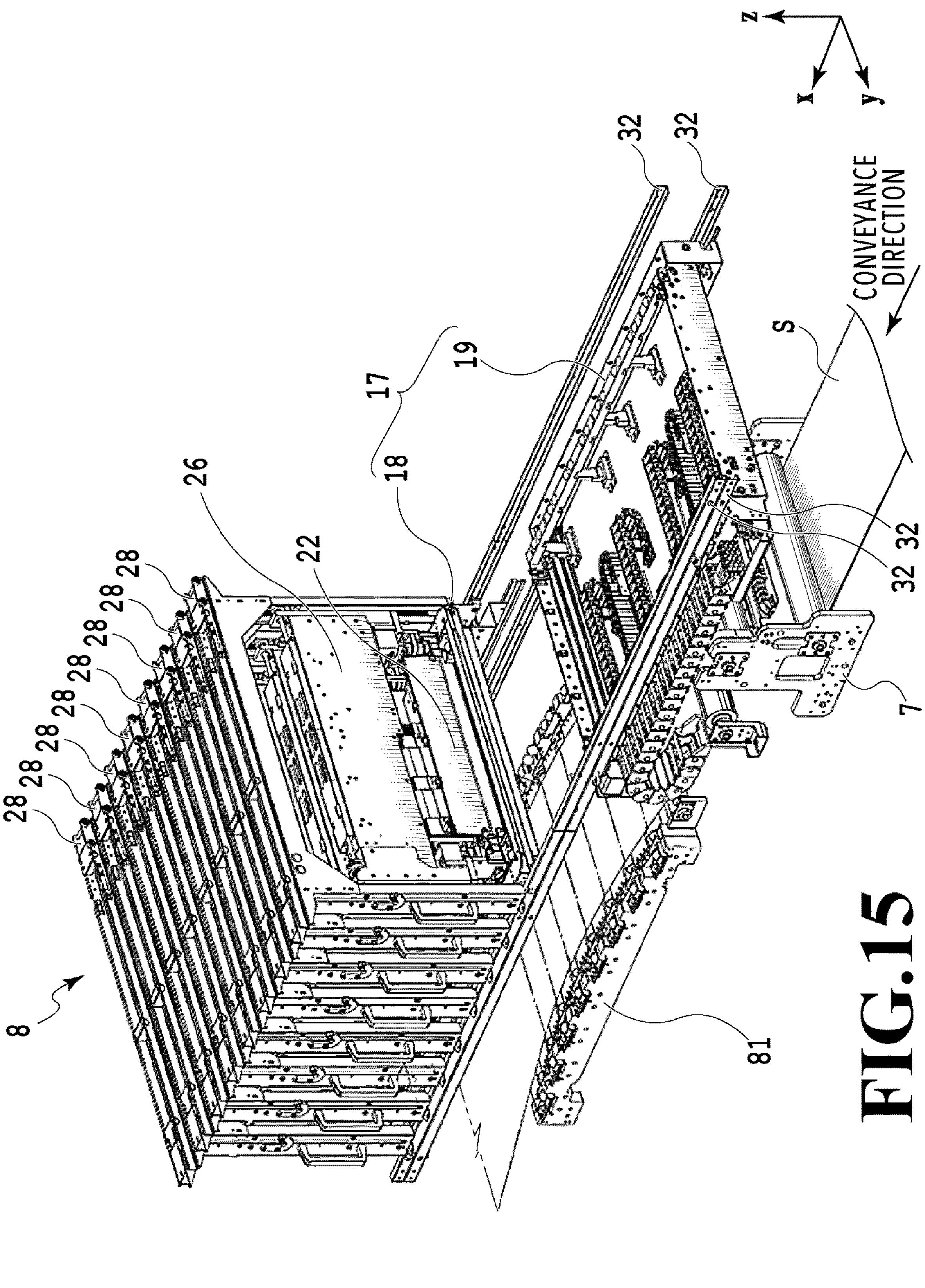
FIG. 15 is a perspective view illustrating disposition of the liquid discharge heads, the cap tray, and the cleaning tray at capping.
Figure 16:
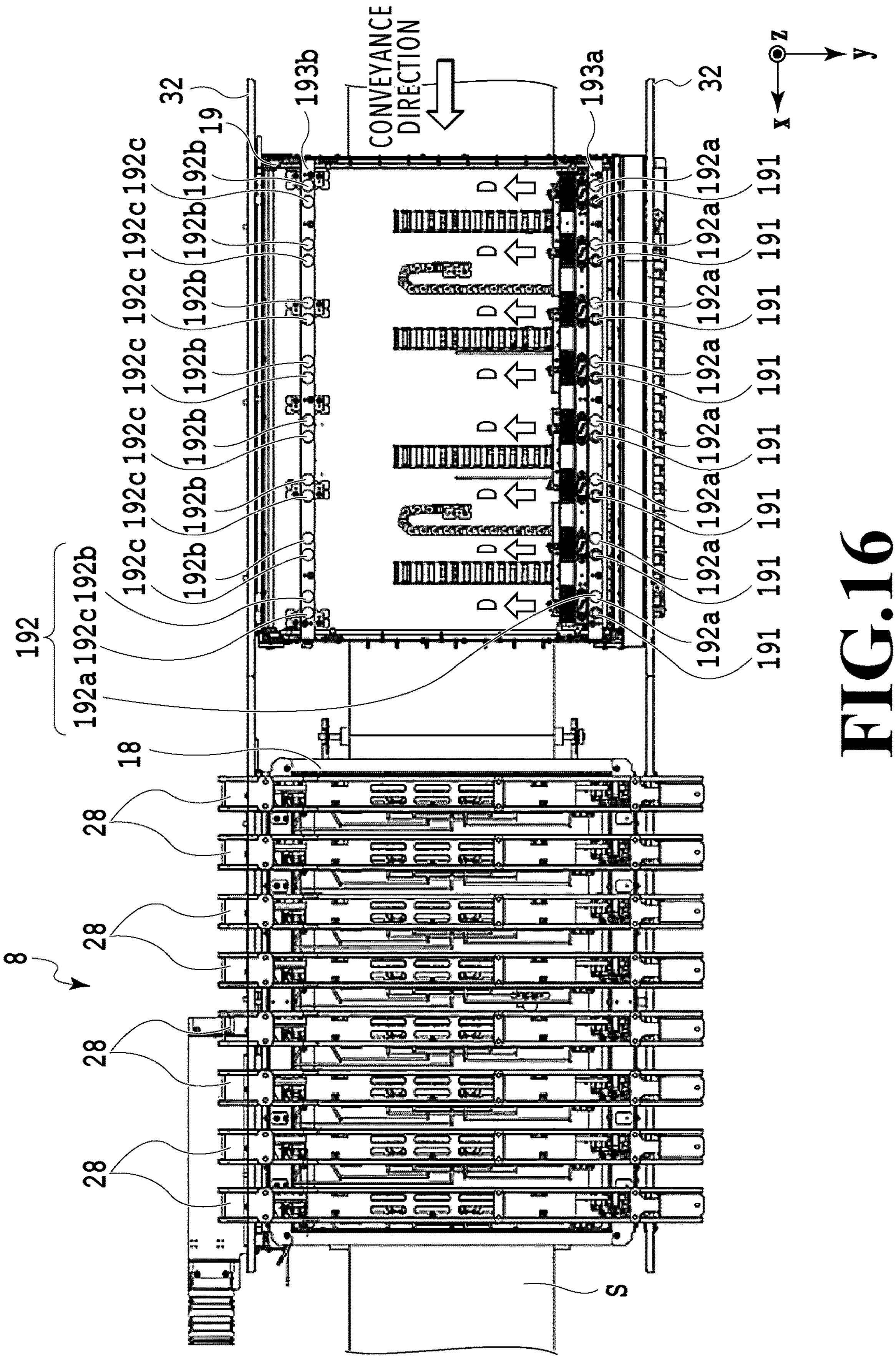
FIG. 16 is a plan view illustrating disposition of the liquid discharge heads, the cap tray, and the cleaning tray at capping.
Figure 17:
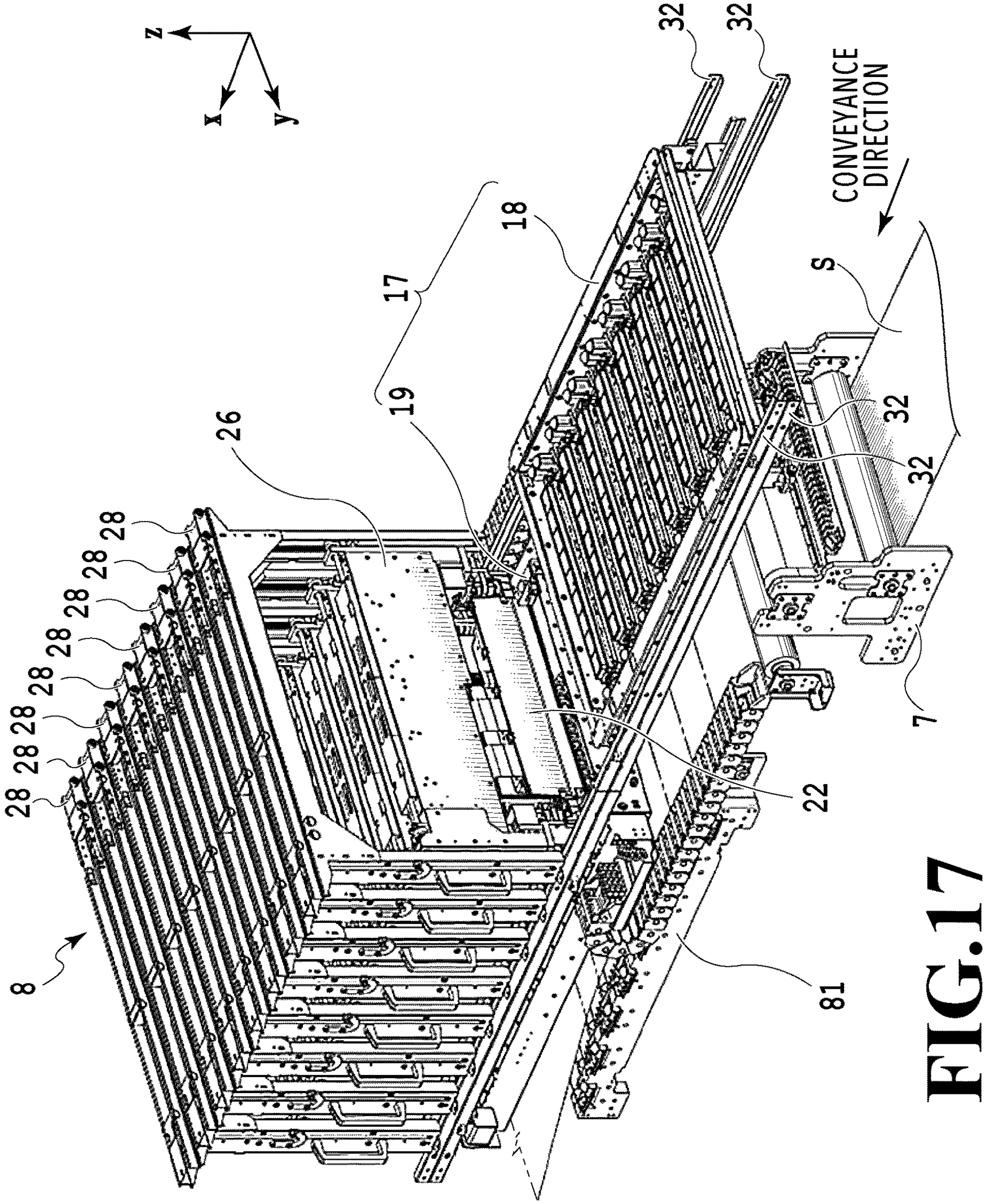
FIG. 17 is a perspective view illustrating disposition of the liquid discharge heads, the cap tray, and the cleaning tray at cleaning.
Figure 18:
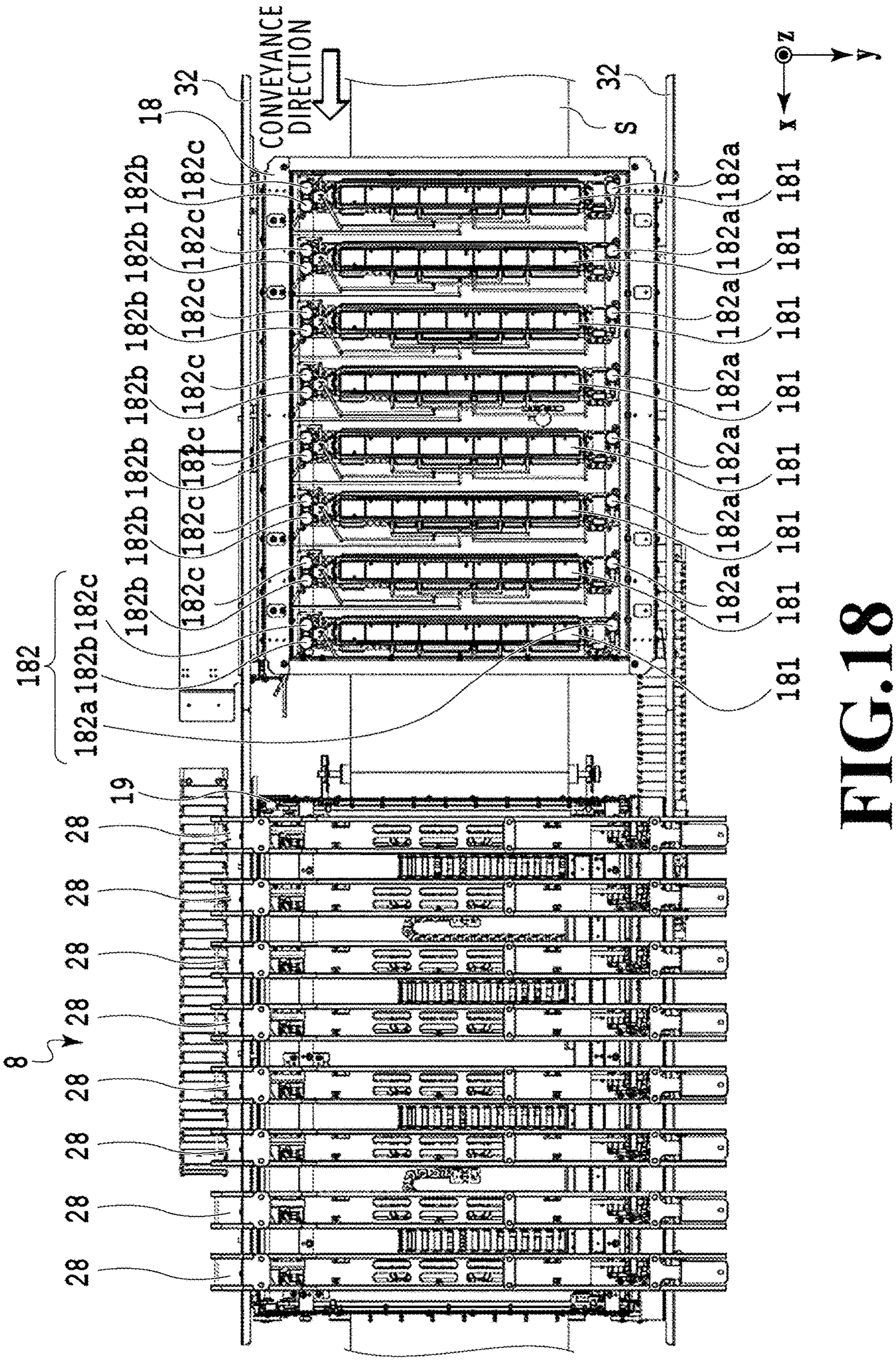
FIG. 18 is a plan view illustrating disposition of the liquid discharge heads, the cap tray, and the cleaning tray at cleaning.

The configuration of the maintenance unit 17 of the liquid discharge apparatus 1 as the embodiment of the present disclosure will be described below. FIGS. 13 and 14 are respectively a perspective view and a front view illustrating the configuration of a main part of the liquid discharge apparatus 1 around the print unit 8. FIGS. 15 and 16 are respectively a perspective view and a top view illustrating a capped state in which the liquid discharge surface of each liquid discharge head 22 is protected by the cap mechanism 181 to be described later. FIGS. 17 and 18 are respectively a perspective view and an apparatus top view illustrating a state of cleaning operation that discharge performance is recovered by a cleaning mechanism to be described later.

As illustrated in FIGS. 8A to 13, the maintenance unit 17 is divided into the cap tray 18 in which the cap mechanisms 181 (refer to FIG. 18) are disposed and the cleaning tray 19 in which cleaning mechanisms 191 (refer to FIG. 16) are disposed. The cap tray 18 and the cleaning tray 19 can be moved in the apparatus longitudinal direction (X direction) by a non-illustrated drive motor and a rail 32 provided at the housing. FIGS. 13 and 14 illustrate a state at printing in which the cap tray 18 and the cleaning tray 19 are positioned upstream of the print unit 8 in the conveyance direction. In this state, the cap tray 18 is positioned directly above the cleaning tray 19. FIGS. 15 and 16 illustrate the capped state of the liquid discharge heads 22 in which the cap tray 18 is positioned directly below the liquid discharge heads 22 of the print unit 8 and the cleaning tray 19 is positioned upstream of the print unit 8 in the conveyance direction. FIGS. 17 and 18 illustrate the state of the liquid discharge heads 22 in the cleaning operation in which the cleaning tray 19 is positioned directly below the liquid discharge heads 22 of the print unit 8 and the cap tray 18 is positioned upstream of the print unit 8 in the conveyance direction.

As illustrated in FIG. 18, the cap tray 18 includes a plurality of spherical liquid discharge head positioning members 182 for positioning the plurality of liquid discharge heads 22. In order to position each liquid discharge head 22 relative to the corresponding cap mechanism 181, it is needed to dispose three liquid discharge head positioning members 182 for the cap mechanism 181 such that the liquid discharge head positioning members 182 are not arranged at least in a line. Thus, in the example of FIG. 18, liquid discharge head positioning members 182*a*, 182*b*, and 182*c* are provided for each cap mechanism 181. The liquid discharge head positioning members 182*a*, 182*b*, and 182*c* are disposed on respective sides of the cap mechanism 181 in the sheet width direction. More specifically, the first liquid discharge head positioning member 182*a* is disposed on the near side (+Y side) of the cap mechanism 181. The second liquid discharge head positioning member 182*b* and the third liquid discharge head positioning member 182*c* are disposed on the far side (−Y side) of the cap mechanism 181. Positioning of each liquid discharge head 22 relative to the cap mechanism 181 is similar to positioning of the liquid discharge head 22 relative to the sheet conveyance unit housing 81. Specifically, each liquid discharge head 22 is positioned relative to the corresponding cap mechanism 181 as the positioning members 221 provided at the respective ends of the liquid discharge head 22 contact the total of three liquid discharge head positioning members 182 for the cap mechanism 181. More specifically, each liquid discharge head 22 is positioned relative to the corresponding cap mechanism 181 as the contact parts 221*a*, 221*b*, and 221*c* formed at the positioning members 221 contact the liquid discharge head positioning members 182*a*, 182*b*, and 182*c*, respectively.

As illustrated in FIG. 16, the cleaning mechanisms 191 in the cleaning tray 19 include a plurality of spherical liquid discharge head positioning members 192 for positioning the plurality of liquid discharge heads 22. In order to position each liquid discharge head 22 relative to the corresponding cleaning mechanism 191, it is needed to dispose three liquid discharge head positioning members 192 for the cleaning mechanism 191 such that the liquid discharge head positioning members 192 are not arranged at least in a line. Thus, in the example of FIG. 16, liquid discharge head positioning members 192*a*, 192*b*, and 192*c* are provided for each cleaning mechanism 191. The liquid discharge head positioning members 192*a*, 192*b*, and 192*c* are disposed on respective sides of the cap mechanism 181 in the sheet width direction. More specifically, the first liquid discharge head positioning member 192*a* is disposed on the apparatus near side of the cleaning mechanism 191, and the second liquid discharge head positioning member 192*b* and the third liquid discharge head positioning member 192*c* are disposed on the apparatus back side of the cleaning mechanism 191. A first beam member 193*a* extending in the conveyance direction on the apparatus front side of the cleaning mechanisms 191, and a second beam member 193*b* extending in the conveyance direction on the apparatus back side of the cleaning mechanisms 191 are disposed in the cleaning tray 19. The first liquid discharge head positioning member 192*a* is disposed on the first beam member 193*a*, and the second liquid discharge head positioning member 192*b* and the third liquid discharge head positioning member 192*c* are disposed on the second beam member 193*b*. Positioning of each liquid discharge head 22 relative to the cleaning tray 19 is similar to positioning of the liquid discharge head 22 relative to the sheet conveyance unit housing 81. Specifically, each liquid discharge head 22 is positioned relative to the corresponding cleaning mechanism 191 as the positioning members 221 provided at the respective ends of the liquid discharge head 22 contact the total of three liquid discharge head positioning members 192 for the cleaning mechanism 191. More specifically, the contact parts 221*a*, 221*b*, and 221*c* formed at the positioning members 221 contact the liquid discharge head positioning members 192*a*, 192*b*, and 192*c*, respectively. Accordingly, each liquid discharge head 22 is positioned relative to the corresponding cleaning mechanism 191.

Note that a positioning configuration is not limited to a configuration in which spherical positioning members are used but may be a configuration in which part of each liquid discharge head 22 is abutted in the cleaning tray 19 or a configuration in which positioning is performed by using holes and pins provided at the cleaning tray 19 and the liquid discharge heads 22.

Figure 19:
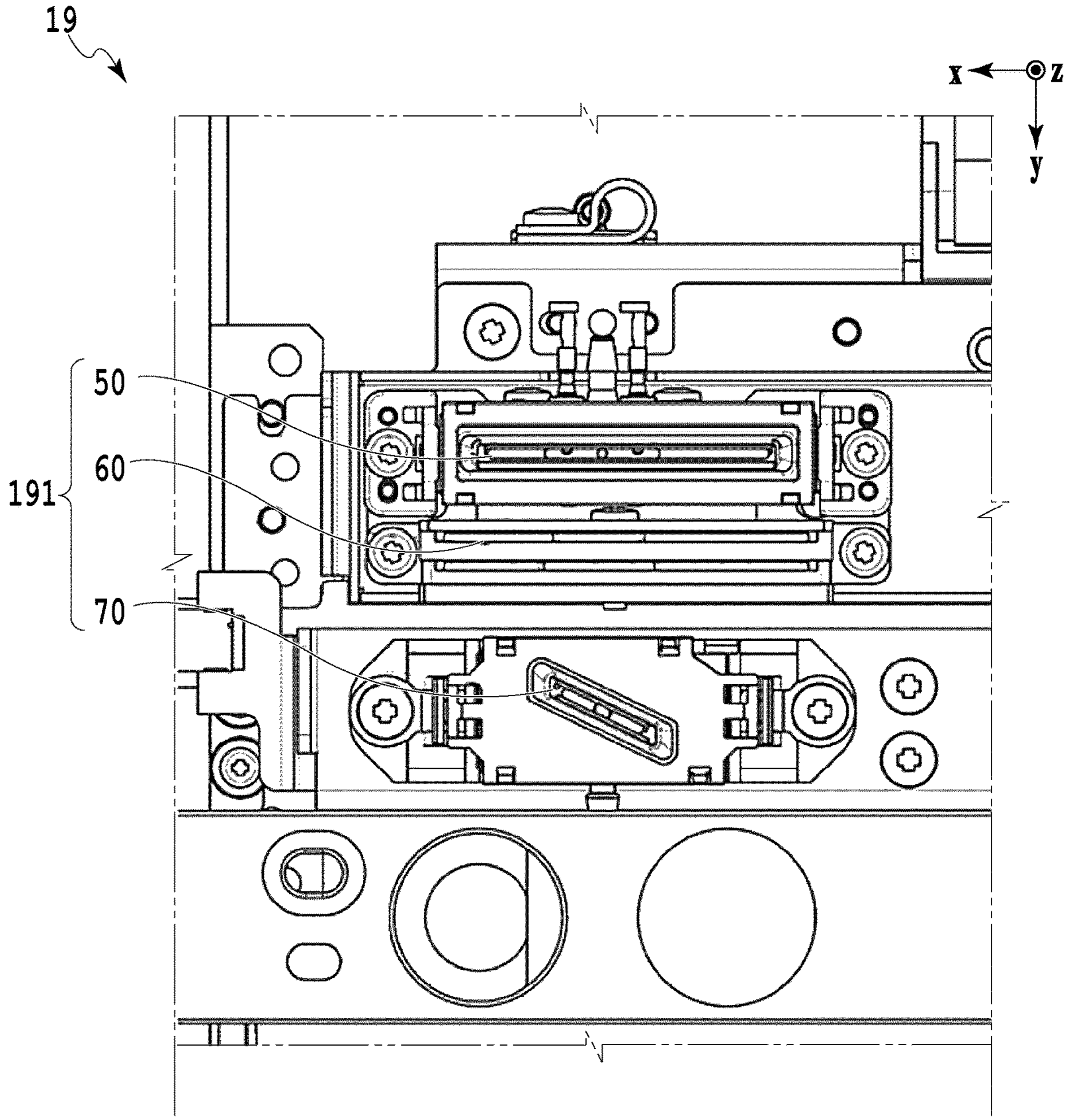
FIG. 19 is a diagram illustrating the configuration of a cleaning mechanism.

FIG. 19 illustrates the configuration of each cleaning mechanism 191 disposed in the cleaning tray 19. The cleaning mechanism 191 includes a cleaning liquid application unit 50, a liquid removal unit 60, and a negative pressure application unit 70. The cleaning liquid application unit 50 applies cleaning liquid to the nozzle plates 223 of the corresponding liquid discharge head 22. The liquid removal unit 60 removes ink, paper powder, and cleaning liquid adhering to the liquid discharge head 22. The negative pressure application unit 70 applies negative pressure to the nozzle plates 223 of the liquid discharge head 22 and removes ink firmly fixed to a nozzle part and bubbles in an ink flow path. The cleaning tray 19 includes a non-illustrated movement mechanism configured to move the cleaning mechanism 191 in a sweep direction D orthogonal to the conveyance direction as illustrated in FIG. 16. The cleaning mechanism 191 removes ink and dust on a nozzle surface of the liquid discharge head with combination of the cleaning liquid application unit 50, the liquid removal unit 60, and the negative pressure application unit 70.

(Operation for Positioning of a Plurality of Liquid Discharge Heads, Cap Tray, and Cleaning Tray)

Figure 20A:
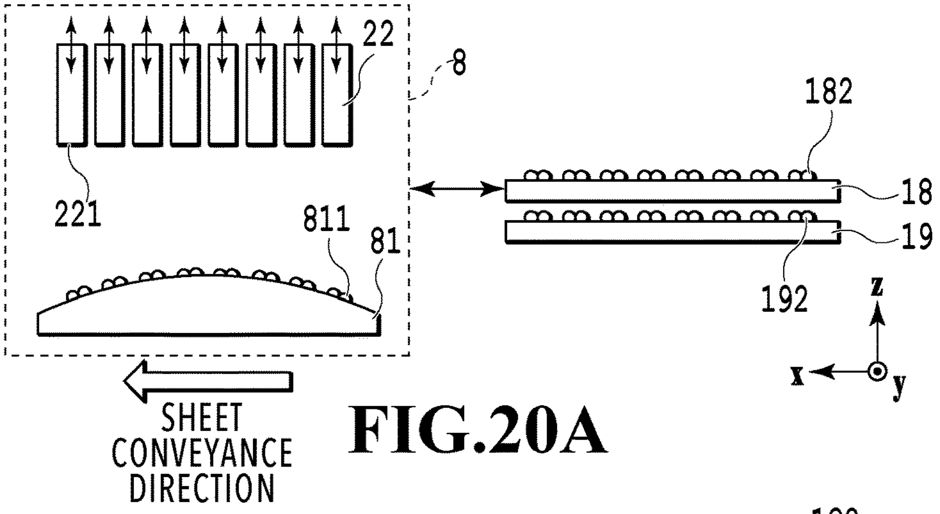
FIGS. 20A to 20D are conceptual front views for description of change of disposition of the liquid discharge heads, the cap tray, and the cleaning tray.
Figure 20B:
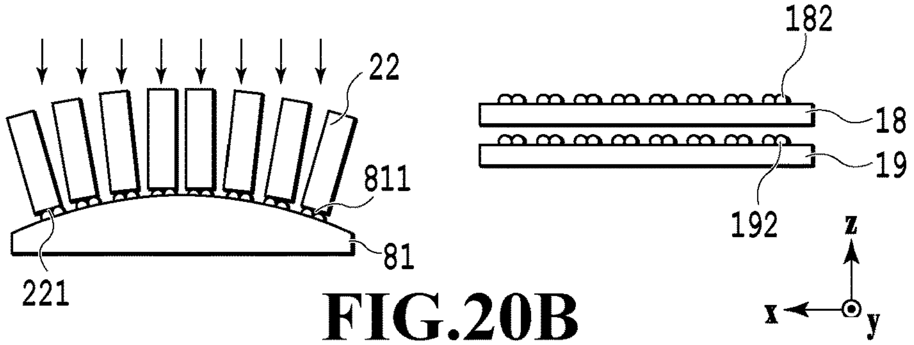
Figure 20C:
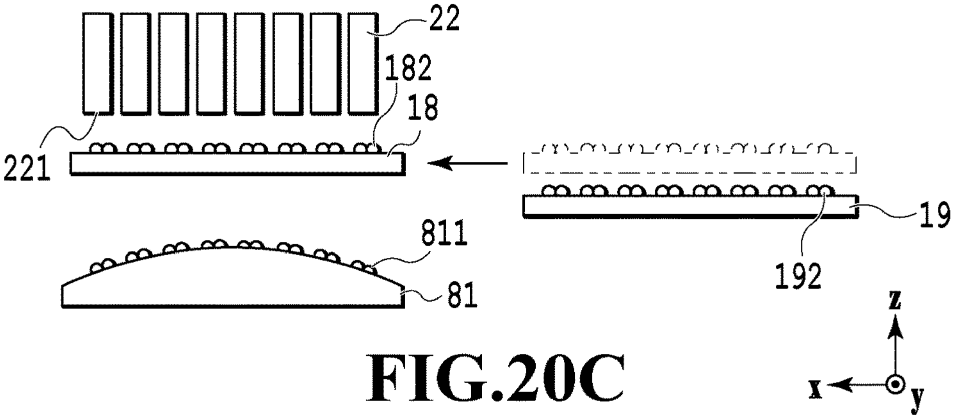
Figure 20D:
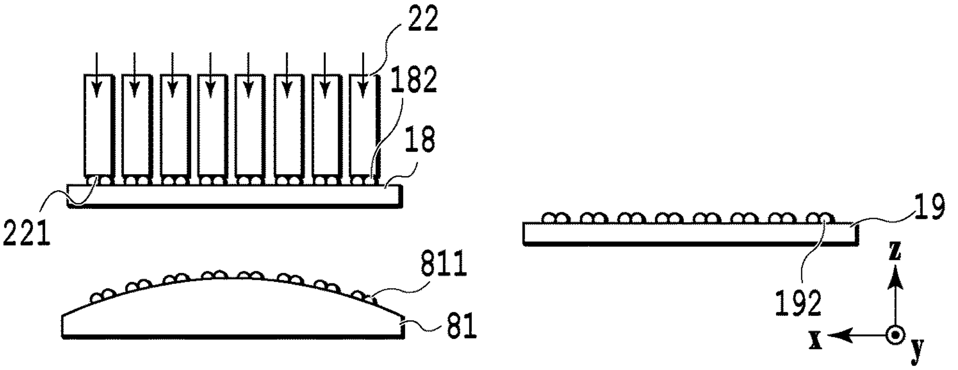
Figure 21A:
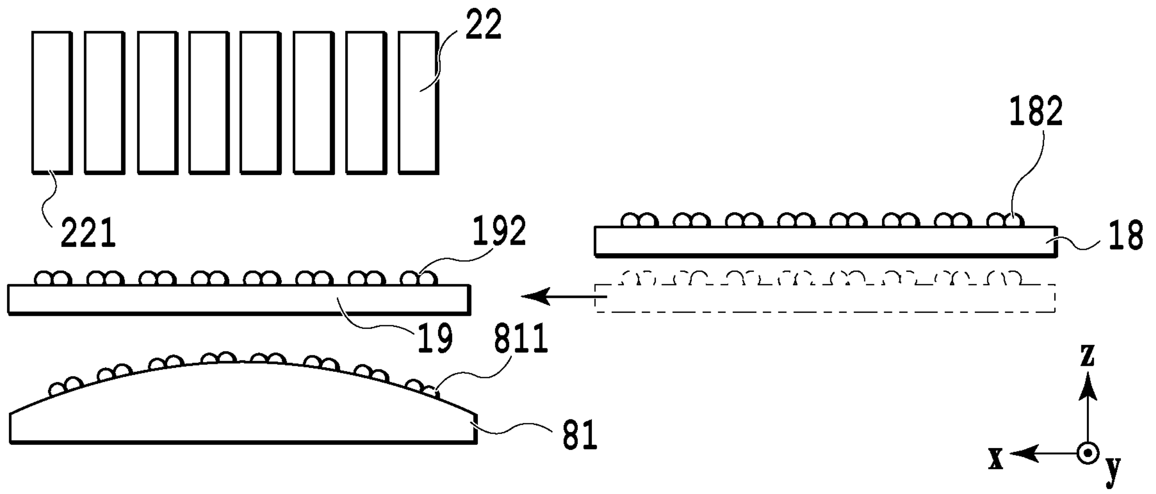
FIGS. 21A and 21B are conceptual front views for description of change of disposition of the liquid discharge heads, the cap tray, and the cleaning tray.
Figure 21B:
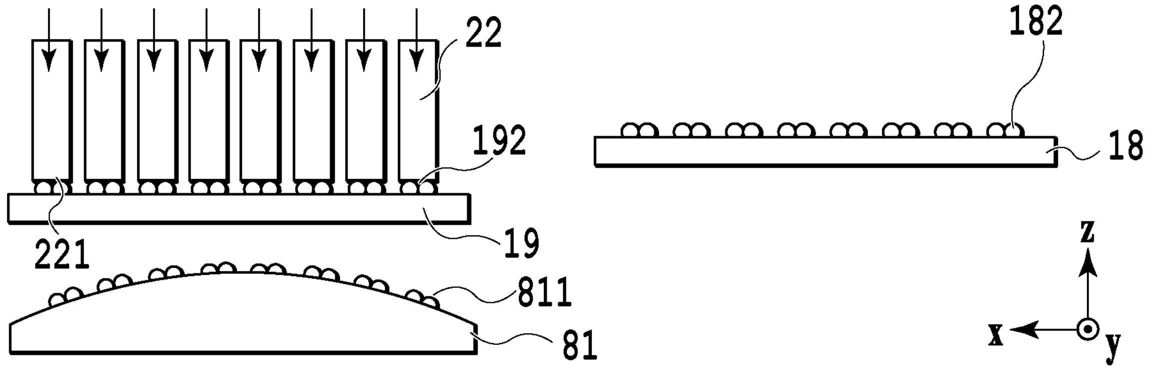

Operation for positioning of the plurality of liquid discharge heads 22, the cap tray 18, and the cleaning tray 19 included in the liquid discharge apparatus 1 as the embodiment of the present disclosure will be described below. FIGS. 20A to 20D are schematic views illustrating operation for positioning the plurality of liquid discharge heads 22 relative to the cap tray 18. FIGS. 21A and 21B are schematic views illustrating operation for positioning the plurality of liquid discharge heads 22 relative to the cleaning tray 19.

Operation including positioning to a cap position will be described below with reference to FIGS. 20A to 20D. FIG. 20A illustrates a state in which the plurality of liquid discharge heads 22, the cap tray 18, and the cleaning tray 19 are retracted at respective retracted positions. FIG. 20B illustrates a state in which the plurality of liquid discharge heads 22 are positioned at print positions and the cap tray 18 and the cleaning tray 19 are retracted at the retracted positions. FIG. 20C illustrates a state in which the cap tray 18 is positioned at a cap position and the plurality of liquid discharge heads 22 and the cleaning tray 19 are retracted at the retracted positions. FIG. 20D illustrates a state in which the plurality of liquid discharge heads 22 and the cap tray 18 are positioned at cap positions and the cleaning tray 19 is retracted at the retracted position.

In the state illustrated in FIG. 20A, the plurality of liquid discharge heads 22 are retracted at the retracted positions above the sheet conveyance unit housing 81. The cap tray 18 and the cleaning tray 19 are substantially horizontally retracted at the respective retracted positions upstream of the plurality of liquid discharge heads 22 in the conveyance direction.

In the state illustrated in FIG. 20B, the plurality of liquid discharge heads 22 are positioned at printing positions for printing an image on the sheet S. Also, in the state illustrated in FIG. 20B, as in the state illustrated in FIG. 20A, the cap tray 18 and the cleaning tray 19 are substantially horizontally retracted at the respective retracted positions upstream of the plurality of liquid discharge heads 22 in the conveyance direction.

A liquid discharge head raising-lowering mechanism corresponding to each liquid discharge head 22 described above with reference to FIG. 3 is used. Accordingly, the plurality of liquid discharge heads 22 can be lowered from the respective retracted positions as illustrated in FIG. 20A to the respective print positions as illustrated in FIG. 20B. As illustrated in FIG. 20B, the positioning members 221 provided at each liquid discharge head 22 at the print position are in contact with the respective liquid discharge head positioning members 811 provided at the sheet conveyance unit housing 81.

In a case when the sheet conveyance unit housing 81 is formed in a circular arc shape as illustrated in FIG. 20B, first, the plurality of liquid discharge heads 22 are lowered until these are detected by a position detection sensor (not illustrated) attached on the body side of the liquid discharge apparatus 1. Then, each liquid discharge head 22 is lowered by a lowering distance set for the liquid discharge head 22. In this manner, the plurality of liquid discharge heads 22 can be moved to mutually different heights relative to the sheet conveyance unit housing 81 formed in a circular arc shape.

In a case when capping of the liquid discharge heads 22 is performed after printing operation, the liquid discharge heads 22 are capped by the cap tray 18.

In a case when capping is performed after printing, first, the plurality of liquid discharge heads 22 at the print positions as illustrated in FIG. 20B are raised to the retracted positions as illustrated in FIG. 20A. Note that the cap tray 18 and the cleaning tray 19 are retracted at the retracted positions.

Subsequently, the cap tray 18 at the retracted position as illustrated in FIG. 20A is horizontally moved to the cap position as illustrated in FIG. 20C. Specifically, the cap tray 18 is (substantially horizontally) moved in the conveyance direction to the cap position below the liquid discharge heads 22.

Subsequently, the plurality of liquid discharge heads 22 at the retracted positions as illustrated in FIG. 20C are lowered to the cap positions as illustrated in FIG. 20D. As illustrated in FIG. 20D, the positioning members 221 provided at each liquid discharge head 22 at the cap position are in contact with the respective liquid discharge head positioning members 182 provided at the cap tray 18.

Operation including positioning to a cleaning position will be described below with reference to FIGS. 21A and 21B. FIG. 21A illustrates a state in which the cleaning tray 19 is positioned at the cleaning position and the plurality of liquid discharge heads 22 and the cap tray 18 are retracted at the retracted positions. FIG. 21B illustrates a state in which the plurality of liquid discharge heads 22 and the cleaning tray 19 are positioned at cleaning positions and the cap tray 18 is retracted at the retracted position.

In a case when, for example, a nozzle of any liquid discharge head 22 is clogged and ink discharge defect occurs after printing operation, the cleaning operation of the liquid discharge heads 22 by the cleaning mechanisms 191 in the cleaning tray 19 is performed.

In a case when cleaning is performed after printing, first, the plurality of liquid discharge heads 22 at the print positions as illustrated in FIG. 20B are raised to the retracted positions as illustrated in FIG. 20A. Note that the cap tray 18 and the cleaning tray 19 are retracted at the retracted positions.

Subsequently, the cleaning tray 19 at the retracted position as illustrated in FIG. 20A is horizontally moved to the cleaning position as illustrated in FIG. 21A. Specifically, the cleaning tray 19 is (substantially horizontally) moved in the conveyance direction to the cleaning position below the liquid discharge heads 22.

Subsequently, the plurality of liquid discharge heads 22 at the retracted positions as illustrated in FIG. 21A are lowered to the cleaning positions as illustrated in FIG. 21B. As illustrated in FIG. 21B, the positioning members 221 provided at each liquid discharge head 22 at the cleaning position contact the respective liquid discharge head positioning members 192 provided at the beam members 193 of the cleaning tray 19.

Since the cap tray 18 is formed straight in the present embodiment, the plurality of liquid discharge heads 22 do not need to be moved to mutually different heights. Thus, the following method is performed to lower the plurality of liquid discharge heads 22 from the retracted positions illustrated in FIG. 20C to the cap positions illustrated in FIG. 20D. First, the plurality of liquid discharge heads 22 are lowered until these are detected by the position detection sensor (not illustrated) attached on the body side of the liquid discharge apparatus 1. Then, the plurality of liquid discharge heads 22 are lowered by a lowering distance set in common for them. The cleaning tray 19 is formed straight as well. Thus, the similar method is performed to lower the plurality of liquid discharge heads 22 from the retracted positions illustrated in FIG. 21A to the cap positions illustrated in FIG. 21B.

(Operation in a Case when Printing is Performed)

Figure 22:
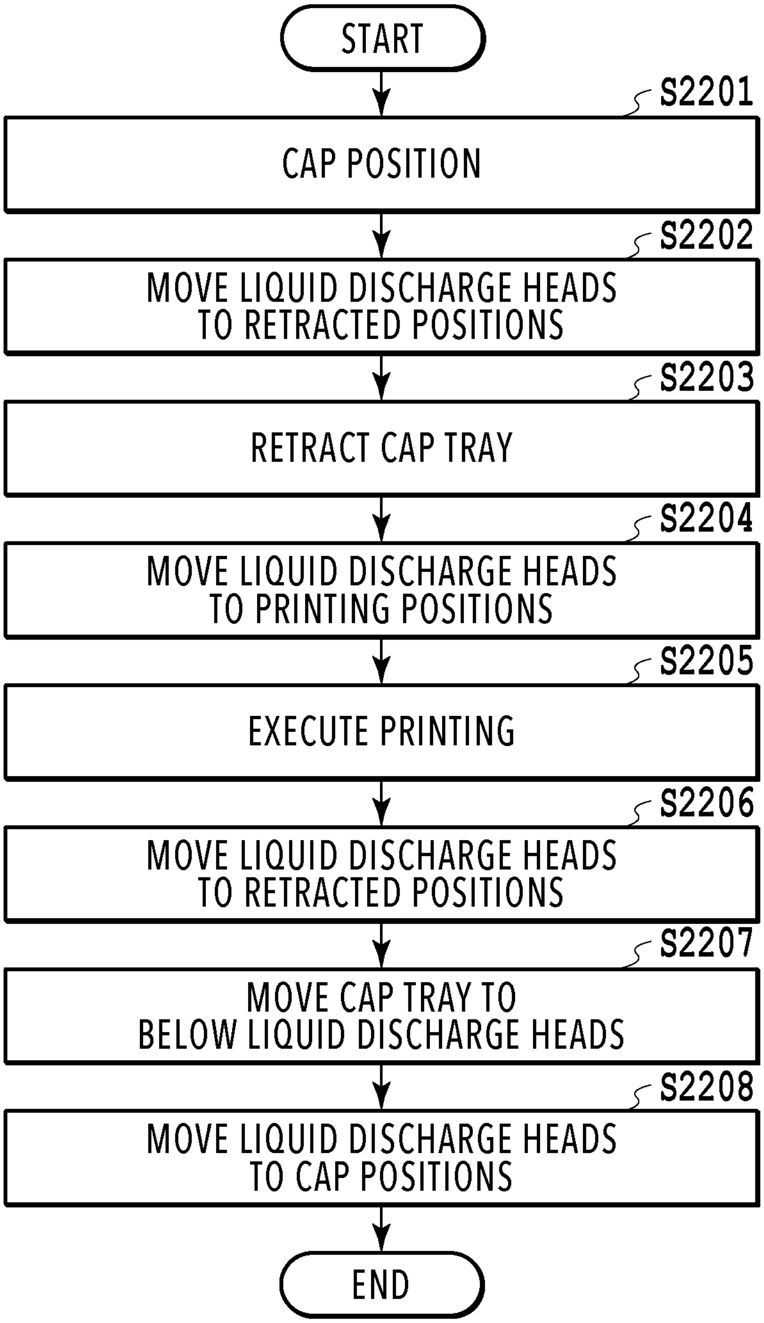
FIG. 22 is a flowchart of operation of positioning the liquid discharge head at printing.

FIG. 22 illustrates a flowchart of operation of positioning the liquid discharge heads 22 in a case when printing is performed. Basically, printing is executed after each liquid discharge head 22 positioned at the cap position is moved to the printing position. Then, each liquid discharge head 22 is moved back to the cap position after the printing ends.

At S2201, as illustrated in FIG. 20D, each liquid discharge head 22 is at the cap position and capped by the corresponding cap mechanism 181 of the cap tray 18.

At S2202, each liquid discharge head 22 is moved to the retracted position as illustrated in FIG. 20C as a drive motor (not illustrated) is driven by the liquid discharge head movement means control unit 408 so that the head holding unit 26 is raised.

At S2203, the cap tray 18 is moved to the retracted position as illustrated in FIG. 20A as the maintenance control unit 410 drives a drive motor (not illustrated) so that the cap tray 18 is horizontally moved to the upstream side along the rail provided at the housing. Accordingly, each liquid discharge head 22 can be lowered to the printing position.

At S2204, each liquid discharge head 22 is positioned to the printing position as illustrated in FIG. 20B as an raising-lowering motor (not illustrated) is driven so that the liquid discharge head 22 is lowered.

At S2205, printing is executed.

At S2206 after the printing ends, each liquid discharge head 22 is moved to the retracted position as illustrated in FIG. 20A as the raising-lowering motor (not illustrated) is driven so that the liquid discharge head 22 is raised.

At S2207, the maintenance control unit 410 drives the drive motor (not illustrated) so that the cap tray 18 is horizontally moved to the downstream side along the rail provided at the housing. In this manner, the cap tray 18 is moved to the cap position as illustrated in FIG. 20C. Accordingly, each liquid discharge head 22 can be lowered to the cap position.

At S2208, each liquid discharge head 22 is positioned to the cap position as illustrated in FIG. 20D as the raising-lowering motor (not illustrated) is driven so that the liquid discharge head 22 is lowered.

(Operation in a Case when Liquid Discharge Heads are Cleaned)

Figure 23:
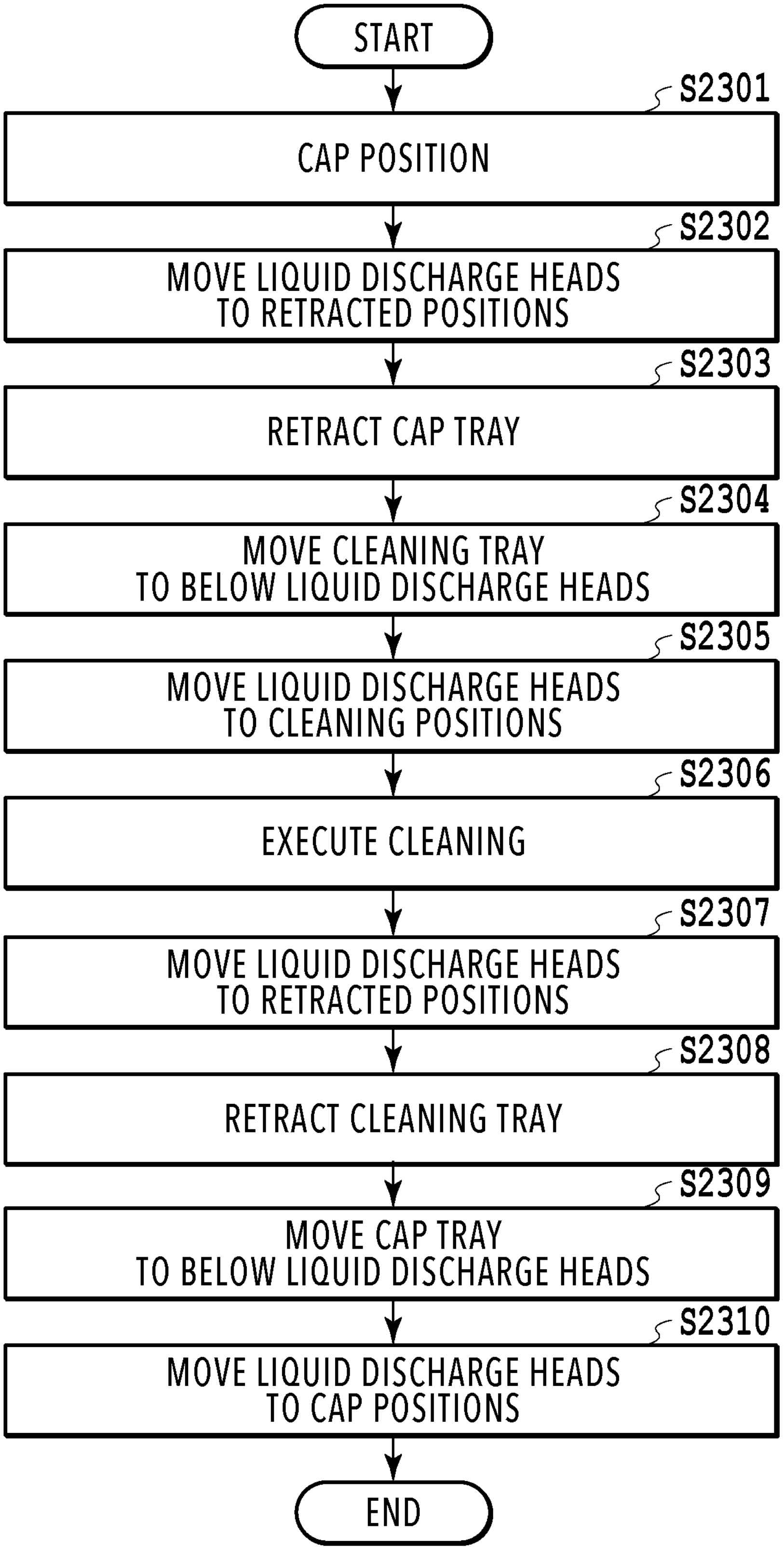
FIG. 23 is a flowchart of operation of positioning the liquid discharge head at cleaning.

FIG. 23 illustrates a flowchart of operation of positioning the liquid discharge heads 22 in a case when the liquid discharge heads 22 are cleaned. Basically, cleaning is executed after each liquid discharge head 22 positioned at the cap position is moved to the cleaning position. Then, each liquid discharge head 22 is moved back to the cap position after the cleaning ends.

At S2301, as illustrated in FIG. 20D, each liquid discharge head 22 is at the cap position and capped by the corresponding cap mechanism 181 of the cap tray 18.

At S2302, each liquid discharge head 22 is moved to the retracted position as illustrated in FIG. 20C as a drive motor (not illustrated) is driven by the liquid discharge head movement means control unit 408 so that the head holding unit 26 is raised.

At S2303, the cap tray 18 is moved to the retracted position as illustrated in FIG. 20A as the maintenance control unit 410 drives a drive motor (not illustrated) so that the cap tray 18 is horizontally moved to the upstream side along the rail provided at the housing. Accordingly, each liquid discharge head 22 can be lowered to the cleaning position.

At S2304, the maintenance control unit 410 drives a drive motor (not illustrated) so that the cleaning tray 19 is horizontally moved to the downstream side along the rail provided at the housing. In this manner, the cleaning tray 19 is moved to the cleaning position as illustrated in FIG. 21A. Accordingly, each liquid discharge head 22 can be lowered to the cleaning position.

At S2305, each liquid discharge head 22 is positioned to the cleaning position as illustrated in FIG. 21B as the raising-lowering motor (not illustrated) is driven so that the liquid discharge head 22 is lowered.

At S2306, cleaning of each liquid discharge head 22 is executed.

At S2307 after the cleaning ends, each liquid discharge head 22 is moved to the retracted position as illustrated in FIG. 21A as the raising-lowering motor (not illustrated) is driven so that the liquid discharge head 22 is raised.

At S2308, the maintenance control unit 410 drives a drive motor (not illustrated) so that the cleaning tray 19 is horizontally moved to the upstream side along the rail provided at the housing. Accordingly, the cleaning tray 19 is moved to the retracted position as illustrated in FIG. 20A.

At S2309, the maintenance control unit 410 drives a drive motor (not illustrated) so that the cap tray 18 is horizontally moved to the downstream side along the rail provided at the housing. In this manner, the cap tray 18 is moved to the cap position as illustrated in FIG. 20C. Accordingly, each liquid discharge head 22 can be lowered to the cap position.

At S2310, each liquid discharge head 22 is positioned to the cap position as illustrated in FIG. 20D as the raising-lowering motor (not illustrated) is driven so that the liquid discharge head 22 is lowered.

(Support Configuration of Liquid Discharge Head and Positioning Thereof to Cap Position)

When each liquid discharge head 22 held by the head holding unit 26 is at the retracted position as illustrated in FIG. 20A, the liquid discharge head 22 has the lowermost relative height Hmin with respect to the head holding unit 26.

Figure 4:
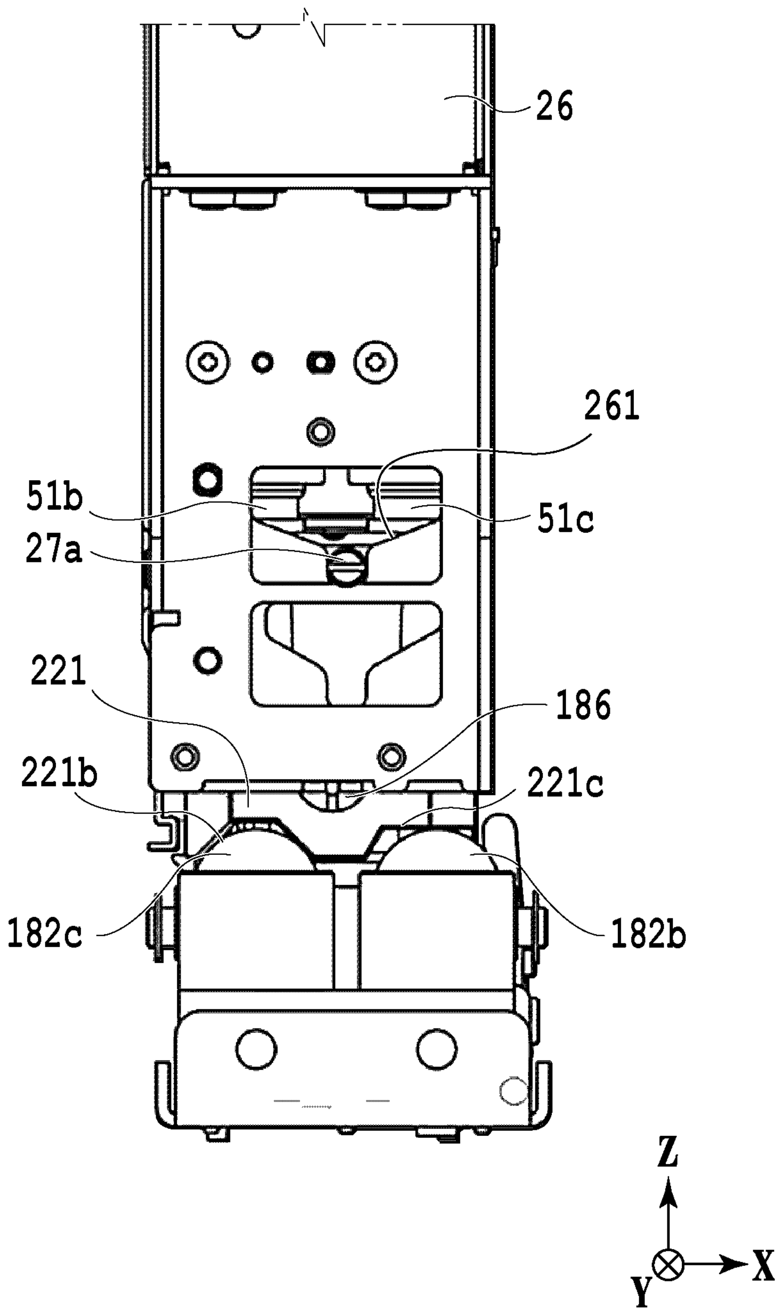
FIG. 4 is a diagram illustrating the right side surface of a liquid discharge head at a maintenance position.
Figure 24:
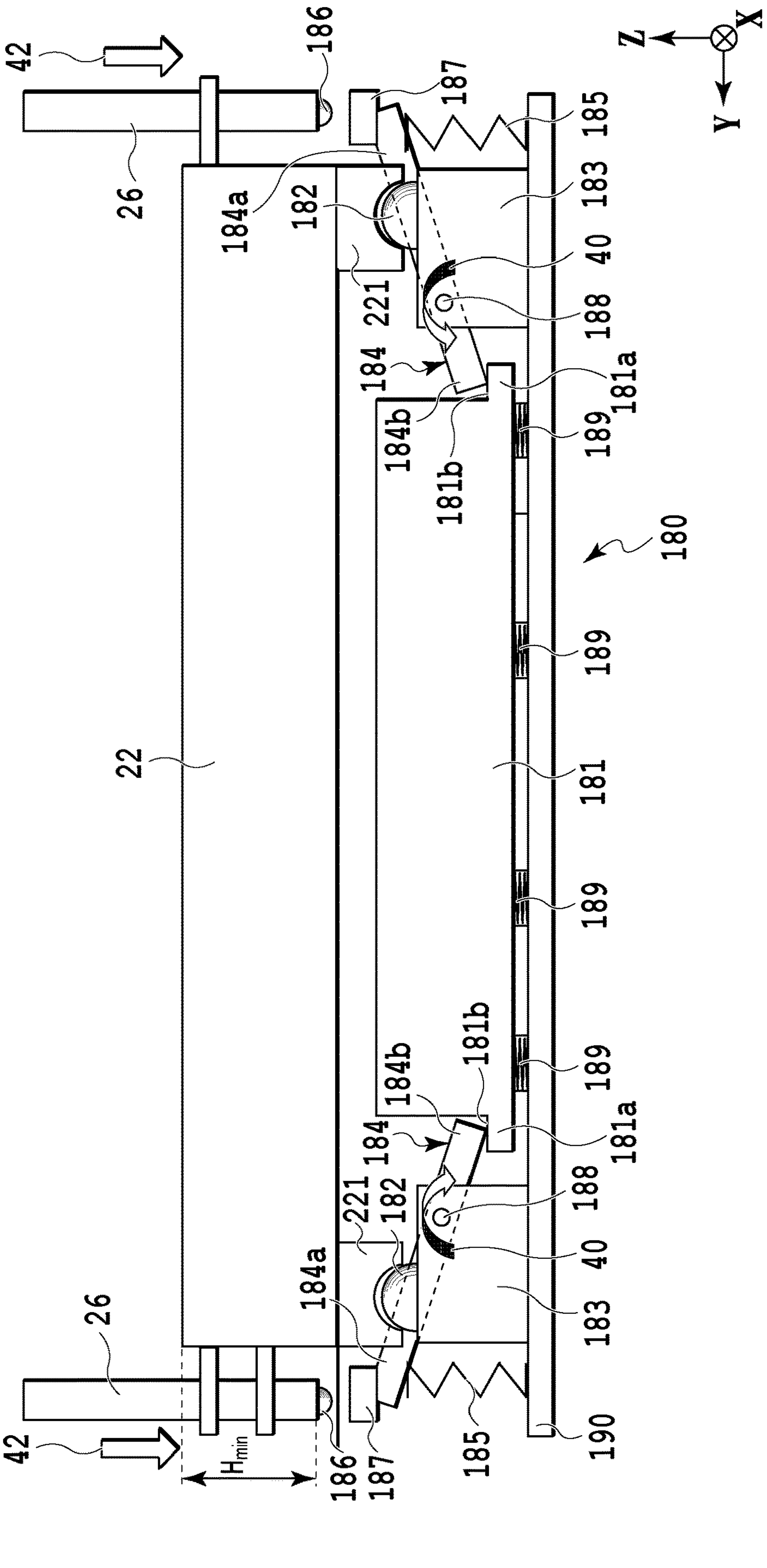
FIG. 24 is an explanatory diagram illustrating a state right after a positioning member of the liquid discharge head contacts a liquid discharge head positioning member of the cap unit.

At S2208 or S2320, the positioning members 221 contact the liquid discharge head positioning members 182, as illustrated in FIG. 24, as each liquid discharge head 22 held by the head holding unit 26 is lowered from the retracted position, as illustrated in FIG. 20A. With this contact, the liquid discharge head 22 is not further lowered. The cap position of the liquid discharge head 22 is a position where the positioning members 221 is in contact with the liquid discharge head positioning members 182. FIGS. 4, 5, and 6 illustrate the head holding unit 26 and the liquid discharge head 22 when the positioning members 221 are moved down to height at which the positioning members 221 contact the liquid discharge head positioning members 182. FIG. 4 is a diagram when viewed from the apparatus back side, FIG. 5 is a diagram when viewed from the apparatus front side, and FIG. 6 is a perspective view when viewed from the downstream side in the conveyance direction. In this state, the cap mechanisms 181 are separated from the liquid discharge heads 22 as illustrated in FIG. 6, which will be described later.

As described above, each liquid discharge head 22 can be displaced higher than the lowermost relative height with respect to the head holding unit 26. In other words, the head holding unit 26 can be displaced lower than the uppermost relative height with respect to the liquid discharge head 22. Thus, after the contact, the head holding unit 26 can be further lowered while the heights of the liquid discharge heads 22 are maintained. In this case, the liquid ejection head 22 has a relative height with respect to the head holding portion 26 that is higher than the lowermost relative height Hmin. As described later, the head holding unit 26 is lowered to height at which the liquid discharge heads 22 can be capped by the cap mechanisms 181. After the contact, the head holding unit 26 is further lowered until the relative height changes from Hmin to Hmax while the heights of the liquid discharge heads 22 are maintained, where Hmax represents a relative height of the liquid discharge head 22 with respect to the head holding unit 26 at which the lowering of the head holding unit 26 is ended.

(Support Configuration of Liquid Discharge Head and Positioning Thereof to Cleaning Position)

When each liquid discharge head 22 held by the head holding unit 26 is at the retracted position as illustrated in FIG. 20A, the liquid ejection head 22 has the lowermost relative height Hmin with respect to the head holding portion 26.

At S2305, the positioning members 221 contact the liquid discharge head positioning members 192 as each liquid discharge head 22 held by the head holding unit 26 is lowered from the retracted position as illustrated in FIG. 20A. With this contact, the liquid discharge head 22 is not further lowered. The cleaning position of the liquid discharge head 22 is a position where the positioning members 221 is in contact with the liquid discharge head positioning members 192.

(Operation of Cap Unit)

Figure 25:
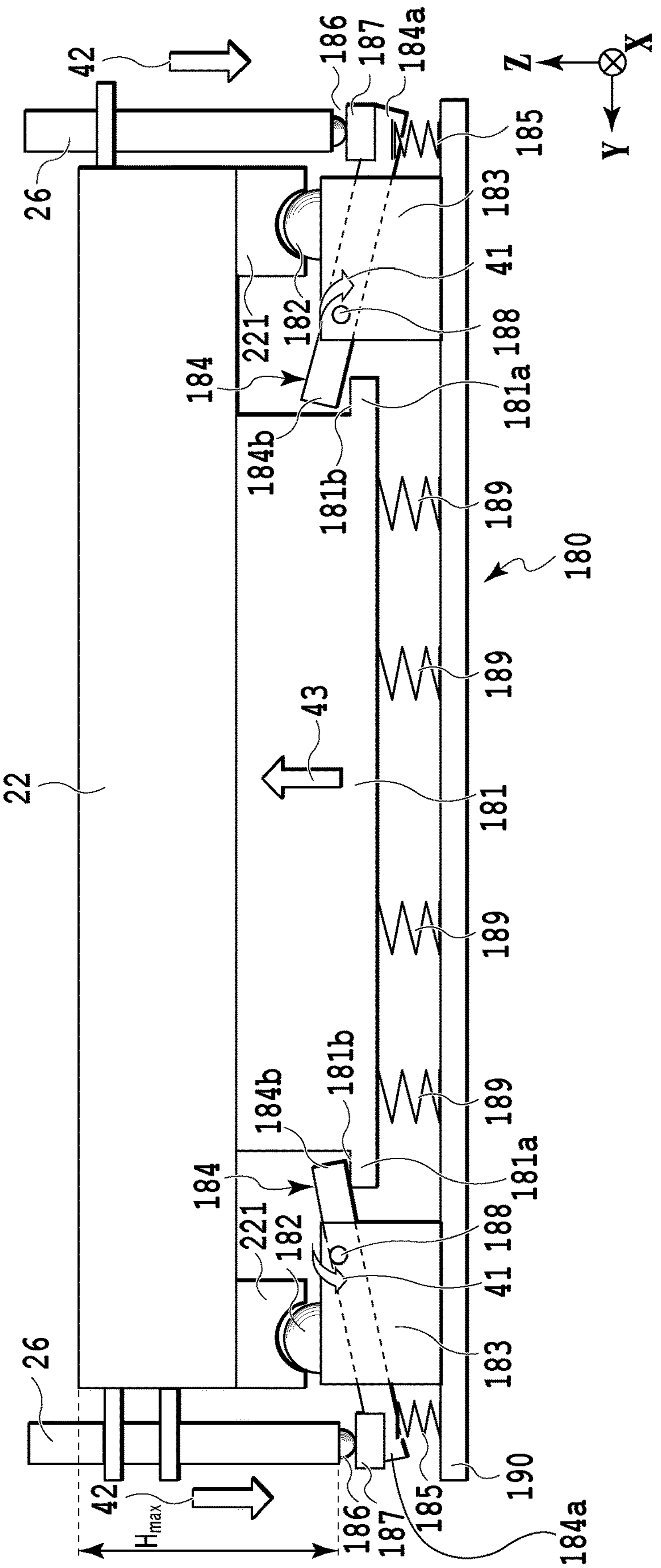
FIG. 25 is an explanatory diagram illustrating a state in which the liquid discharge head is capped.

FIG. 24 is a diagram illustrating a state in which each liquid discharge head 22 is positioned at the cap position and not in contact with the corresponding cap mechanism 181 included in a cap unit 180. FIG. 25 is a diagram illustrating a state in which each liquid discharge head 22 is positioned at the cap position and in contact with the corresponding cap mechanism 181 included in the cap unit 180. As the head holding unit 26 is lowered at S2208 or S2320, the head holding unit 26, the liquid discharge head 22, and the cap mechanism 181 transition through the state as illustrated in FIG. 24 to the state as illustrated in FIG. 25.

As described above, each liquid discharge head 22 is held by the head holding unit 26 such that the liquid discharge head 22 can be moved upward and downward with respect to the housing 190 and with respect to the head holding unit 26. The liquid discharge head 22 has the lowermost relative height Hmin with respect to the head holding unit 26 in the state illustrated in FIG. 24 and has the uppermost relative height Hmax with respect to the head holding unit 26 in the state illustrated in FIG. 25.

Pressing portions 186 are provided at lower end parts of the head holding unit 26.

The cap unit 180 includes a cap mechanism 181, cap pressing springs 189, the liquid discharge head positioning members 182, positioning holding members 183, cap retraction members (separation members) 184, cap retraction springs 185, and pressing target portions 187.

The cap mechanism 181 is a mechanism configured to cap the corresponding liquid discharge head 22.

The cap pressing springs 189 are elastic members provided between a housing 190 of the liquid discharge apparatus 1 and the cap mechanism 181 and pressing the cap mechanism 181 upward.

The liquid discharge head positioning members 182 are members for positioning the liquid discharge head 22 to the cap position. The liquid discharge head 22 is positioned to the cap position when the positioning members 221 provided at the liquid discharge head 22 contact the liquid discharge head positioning members 182.

The positioning holding members 183 are members for holding the liquid discharge head positioning members 182.

Each cap retraction member 184 is a member in a bar shape, a pressing target portion 187 is provided at one leading end part 184*a*, and the other leading end part 184*b* presses an upper surface 181*b* of a protrusion portion 181*a* of the cap mechanism 181 from above. A rotational shaft 188 provided at the corresponding positioning holding member 183 extends through a bearing (not illustrated) provided near a central part of the cap retraction member 184 in the longitudinal direction. Accordingly, the cap retraction member 184 is rotatable about the rotational shaft 188 and converts upward-downward movement of the pressing target portion 187 and the one leading end part 184*a* into upward-downward movement of the other leading end part 184*b* in the opposite direction.

Each cap retraction spring 185 pressing the one leading end part 184*a* of the corresponding cap retraction member 184 upward is provided between the housing 190 of the liquid discharge apparatus 1 and the leading end part 184*a*.

At S2208 or S2320, the head holding unit 26 is lowered (moved in a direction illustrated with arrow 42 in FIG. 24). The pressing portions 186 are separated from the pressing target portions 187 in a state in which the head holding unit 26 is lowered to a position where the positioning members 221 contact the liquid discharge head positioning members 182 as illustrated in FIG. 24. Accordingly, moment M1 due to the pressing force of the cap retraction springs 185 and moment M2 due to the pressing force of the cap pressing springs 189 are exerted on the cap retraction members 184, but no moment due to lowering of the head holding unit 26 is exerted. The moment M1 has an orientation with which the cap retraction members 184 rotate in the direction of arrow 40, and the moment M2 has an orientation (orientation of arrow 41 in FIG. 25) with which each cap retraction members 184 rotates in a direction opposite the direction of arrow 40 in FIG. 24. The pressing force of each cap retraction spring 185, the pressing force of each cap pressing spring 189, the distance between each leading end part 184*a* and each rotational shaft 188, and the distance between each leading end part 184*b* and each rotational shaft 188 are set such that the moment M1 is greater than the moment M2. Thus, their composite moment MA (=M1+M2) has an orientation with which each cap retraction member 184 rotates in the direction of arrow 40. Accordingly, in the state as illustrated in FIG. 24, each protrusion portion 181*a* of the cap mechanism 181 is pressed downward by the leading end part 184*b* of the corresponding cap retraction member 184, and the cap mechanism 181 maintains a position separated downward from the liquid discharge head 22.

At S2208 or S2320, the head holding unit 26 is further lowered after the head holding unit 26 is lowered to a position illustrated in FIG. 24 where the positioning members 221 contact the liquid discharge head positioning members 182. The pressing portion 186 starts to press the pressing target part 187 when the head holding unit 26 is lowered, from the position as illustrated in FIG. 24, to a position apart downward from the position as illustrated in FIG. 24 by the distance between the pressing portion 186 and the pressing target part 187 in the state as illustrated in FIG. 24.

As the head holding unit 26 is lowered, the pressing portions 186 presses the pressing target portions 187 downward against the pressing force of the cap retraction springs 185. Specifically, the pressing portion 186 pushes the tip portion 184*a* of the cap retraction member 184 downward via the pressed portion 187 so as to offset the force with which the cap retraction spring 185 urges the tip portion 184*a* from below. Specifically, the pressing portions 186 press the leading end parts 184*a* downward through the pressing target portions 187 in order to cancel force by the cap retraction springs 185 with which the leading end parts 184*a* of the cap retraction members 184 are pressed from below. Accordingly, downward pressing force that the protrusion portions 181*a* of the cap mechanism 181 receive from the leading end parts 184*b* of the cap retraction members 184 is canceled. Thus, the cap mechanism 181 is moved upward (in a direction illustrated with arrow 43 in FIG. 25) by the upward pressing force of the cap pressing springs 189, and the cap retraction members 184 rotate as illustrated with arrow 41 in FIG. 25. Accordingly, in a duration in which the head holding unit 26 is lowered, the cap mechanism 181 is moved upward (in the direction illustrated with arrow 43 in FIG. 25) by the upward pressing force of the cap pressing springs 189.

Then, the head holding unit 26 ends lowering when the head holding unit 26 reaches a position as illustrated in FIG. 25. In this state, the upward pressing force of the cap pressing springs 189 on the cap mechanism 181 is maintained.

Through the above-described operation, first, positioning of each liquid discharge head 22 relative to the cap unit 180 is performed. Thereafter, the corresponding cap mechanism 181 contacts the liquid discharge head 22 while the positioning is maintained. Thus, only force in a compression direction without force in a shear direction is exerted on a sealing member (not illustrated), or the like, disposed at part of the cap mechanism 181, which contacts the liquid discharge head 22. Accordingly, a favorable contact state (that is, sealing property) can be ensured.

The cap retraction springs 185 in the above embodiment are compression springs that press leading end parts 184*a* of cap retraction members 194 from below. However, the cap retraction springs 185 may be tension springs that pull leading end parts 184*a* of cap retraction members 194 from above. Similarly, cap pressing springs 189, in the above embodiment, are compression springs that press the cap mechanism 181 from below. However, the cap pressing springs 189 may be tension springs that pull the cap mechanism 181 from above. The cap retraction springs 185, the cap pressing springs 189, and the tension springs are examples of biasing means, and other types of biasing means may be used.

Second Embodiment

Figure 26:
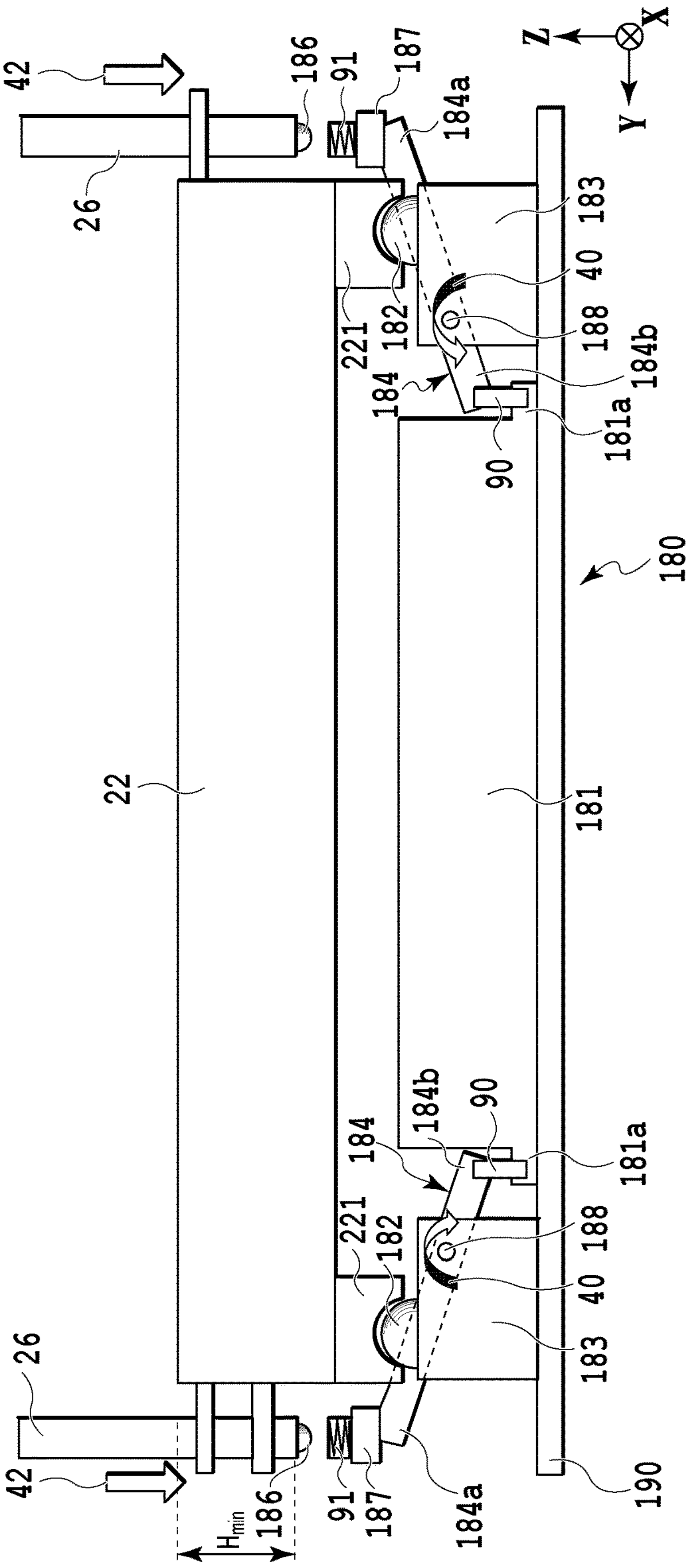
FIG. 26 is an explanatory diagram illustrating a state right after the positioning member of the liquid discharge head contacts the liquid discharge head positioning member of the cap unit in another embodiment.
Figure 27:
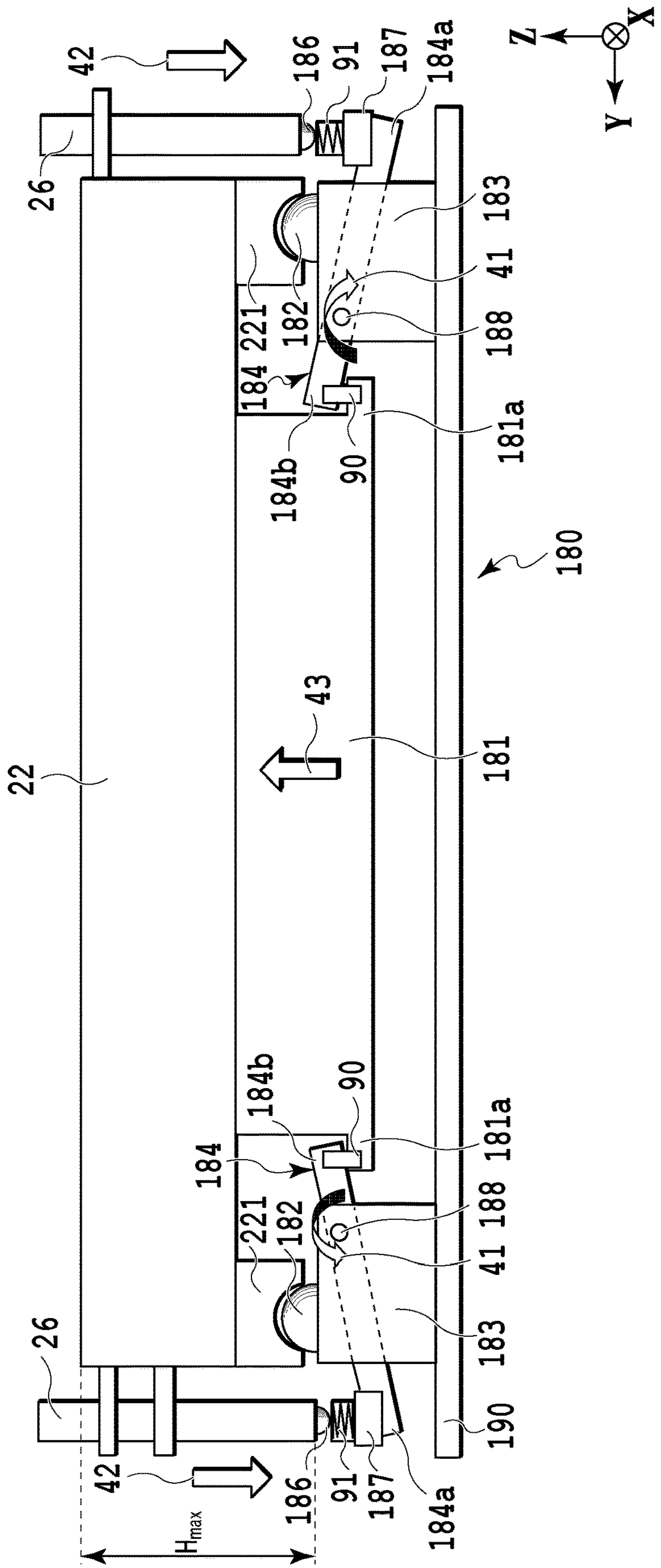
FIG. 27 is an explanatory diagram illustrating a state in which the liquid discharge head is capped in another embodiment.

FIG. 26 is a diagram illustrating a state in which the liquid discharge head 22 is positioned at the cap position and the corresponding cap mechanism 181 included in the cap unit 180 is not in contact with the liquid discharge head 22 in another embodiment. FIG. 27 is a diagram illustrating a state in which each liquid discharge head 22 is positioned at the cap position and the corresponding cap mechanism 181 included in the cap unit 180 is in contact with the liquid discharge head 22 in the other embodiment.

In the above-described embodiment, the cap mechanism 181 is pressed downward by the cap retraction members 184 in the state as illustrated in FIG. 24. In the state as illustrated in FIG. 25, the pressing force of the cap retraction members 184 on the cap mechanism 181 is canceled and the cap mechanism 181 is moved in the direction of arrow 43 by the upward pressing force of the cap pressing springs 189.

In the present embodiment, as illustrated in FIG. 26, the leading end part 184*b* of each cap retraction member 184 and the corresponding protrusion portion 181*a* of the cap mechanism 181 are connected to each other through a link member 90. In the state illustrated in FIG. 26, the cap mechanism 181 is retracted from the liquid discharge head 22 by own weight.

In the state illustrated in FIG. 27, the head holding unit 26 is moved downward as illustrated with arrow 42 relative to the state illustrated in FIG. 26. A pressing spring 91 is disposed on the leading end part 184*a* of each of the cap retraction members 184 with interpolation of the pressing target portion 187. The pressing portions 186 of each of the head holding units 26 presses the pressing target portion 187 with interpolation of the pressing spring 91. Through the pressing spring 91, the leading end parts 184*a* of the cap retraction members 184 can be pressed downward by constant force. Note that each pressing spring 91 may be disposed on the corresponding pressing portion 186 side of the head holding unit 26 or may be disposed on the pressing target portion 187 side of the corresponding cap retraction member 184. With the pressing, each cap retraction member 184 rotates about the rotational shaft 188 in a direction illustrated with arrow 41. With the rotation, the cap mechanism 181 is moved upward as illustrated with arrow 43 through link by the link members 90 and contacts the liquid discharge head 22.

OTHER EMBODIMENTS

In the above-described embodiments, a description is made with droplet discharge heads configured to discharge droplets of ink as an example, but the present disclosure is not limited thereto and droplet discharge heads configured to discharge droplets of liquid other than ink may be used.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid discharge apparatus comprising:

a holding unit configured to hold a discharge head configured to discharge liquid;

a cap configured to cap a discharge surface of the discharge head;

a positioning unit configured to position the discharge head at a cap position where the discharge surface is capped by the cap; and a separation member configured to separate the cap from the discharge surface positioned at the cap position in a case when the separation member is in a first posture and to bring the cap into contact with the discharge surface positioned at the cap position in a case when the separation member is in a second posture, wherein the separation member changes posture between the first posture and the second posture as the holding unit is displaced relative to the discharge head in a state in which the discharge head is positioned at the cap position by the positioning unit, wherein the discharge head is held by the holding unit such that the holding unit relatively displaces with respect to the discharge head in a direction in which the holding unit is displaced, and wherein the discharge head is biased toward the cap position such that the discharge head is displaced relative to the holding unit and displacement of the discharge head relative to the holding unit toward the cap position is restricted at a predetermined relative position.

2. The liquid discharge apparatus according to claim 1, wherein the separation member is in the first posture in a case when the discharge head is at a position separated from the cap position.

3. The liquid discharge apparatus according to claim 1, wherein the discharge head moves between the cap position and a position separated from the cap position as the holding unit moves while the position of the discharge head relative to the holding unit is maintained.

4. The liquid discharge apparatus according to claim 1, further comprising:

a first biassing member configured to bias the cap in a direction from a position where the cap is separated from the discharge surface of the discharge head positioned at the cap position by the positioning unit toward a position where the cap is in contact with the discharge surface of the discharge head positioned at the cap position by the positioning unit; and a second biassing member configured to bias the separation member in a direction in which the separation member changes posture from the second posture to the first posture, wherein, in a case when the discharge head is at a position separated from the cap position, the cap is separated from the discharge surface of the discharge head positioned at the cap position by the positioning unit as a biasing force of the second biassing member through the separation member is more strongly exerted on the cap than a force of the first biassing member.

5. The liquid discharge apparatus according to claim 4, wherein, in a case when the discharge head is positioned at the cap position by the positioning unit, the cap contacts the discharge surface of the discharge head positioned at the cap position by the positioning unit as the holding unit being displaced relative to the discharge head exerts, on the separation member, a force in a direction in which a biasing force of the second biassing member is compensated.

6. The liquid discharge apparatus according to claim 1, wherein the positioning unit includes a positioning member provided to the discharge head, and a positioning member provided to a tray.

7. The liquid discharge apparatus according to claim 6, wherein three contact parts are formed at the positioning member provided to the discharge head, three of the positioning members are provided to the tray, and the discharge head is positioned at the cap position as the three contact parts formed at the positioning member provided to the discharge head contact the three positioning members provided to the tray, respectively.

8. A liquid discharge apparatus comprising:

a holding unit configured to hold a discharge head configured to discharge liquid;

a cap configured to cap a discharge surface of the discharge head;

a positioning unit configured to position the discharge head at a cap position where the discharge surface is capped by the cap; and a separation member configured to separate the cap from the discharge surface positioned at the cap position in a case when the separation member is in a first posture and to bring the cap into contact with the discharge surface positioned at the cap position in a case when the separation member is in a second posture, wherein the separation member changes posture between the first posture and the second posture as the holding unit is displaced relative to the discharge head in a state in which the discharge head is positioned at the cap position by the positioning unit, wherein, in a case when the discharge head is at a position separated from the cap position, the cap is separated, by its own weight, from the discharge surface of the discharge head positioned at the cap position by the positioning unit, the cap is connected to the separation member by a link member, and, in a case when the discharge head is positioned at the cap position by the positioning unit, the cap contacts the discharge surface of the discharge head positioned at the cap position by the positioning unit as the holding unit being displaced relative to the discharge head exerts, on the separation member, a force equal to or greater than a force that compensates for a force due to its own weight.

* * * * *